(12) United States Patent
Schnapp et al.

(10) Patent No.: US 9,223,516 B2
(45) Date of Patent: Dec. 29, 2015

(54) DATA ACCESSING METHOD AND APPARATUS FOR PERFORMING THE SAME USING A HOST LOGICAL UNIT (HLUN)

(75) Inventors: Michael Gordon Schnapp, Taipei Hsien (TW); Ching-Hao Chou, Taipei (TW)

(73) Assignee: INFORTREND TECHNOLOGY, INC., New Taipei (TW)

( * ) Notice: Subject to any disclaimer, the term of this patent is extended or adjusted under 35 U.S.C. 154(b) by 0 days.

(21) Appl. No.: 12/717,954

(22) Filed: Mar. 5, 2010

(65) Prior Publication Data

US 2010/0274977 A1 Oct. 28, 2010

Related U.S. Application Data

(60) Provisional application No. 61/171,472, filed on Apr. 22, 2009.

(51) Int. Cl.
| | | |
|---|---|---|
| *G06F 12/10* | (2006.01) | |
| *G06F 3/06* | (2006.01) | |
| *G06F 12/02* | (2006.01) | |

(52) U.S. Cl.
CPC ............ *G06F 3/0665* (2013.01); *G06F 3/0622* (2013.01); *G06F 3/0644* (2013.01); *G06F 3/0689* (2013.01); *G06F 12/0284* (2013.01); *G06F 12/0292* (2013.01); *G06F 12/10* (2013.01); *G06F 12/1009* (2013.01); *G06F 12/109* (2013.01)

(58) Field of Classification Search
CPC ... G06F 3/0622; G06F 3/0689; G06F 3/0665; G06F 3/0644; G06F 12/0284; G06F 12/0292; G06F 12/10; G06F 12/1009; G06F 12/109
USPC .......................................... 711/154, 202–209
See application file for complete search history.

(56) References Cited

U.S. PATENT DOCUMENTS

| | | | | |
|---|---|---|---|---|
| 2004/0054866 | A1* | 3/2004 | Blumenau et al. | 711/202 |
| 2004/0240297 | A1* | 12/2004 | Shimooka et al. | 365/222 |
| 2005/0120174 | A1* | 6/2005 | Uratani et al. | 711/114 |
| 2005/0144384 | A1* | 6/2005 | Eguchi et al. | 711/114 |
| 2006/0031636 | A1* | 2/2006 | Mizuno | 711/114 |
| 2006/0101204 | A1* | 5/2006 | Bao | 711/114 |
| 2007/0079098 | A1* | 4/2007 | Kitamura | 711/170 |
| 2007/0168470 | A1* | 7/2007 | Nonaka et al. | 709/219 |
| 2009/0228632 | A1* | 9/2009 | Murayama et al. | 711/100 |
| 2010/0023847 | A1* | 1/2010 | Morita et al. | 714/801 |

* cited by examiner

*Primary Examiner* — Arpan P. Savla
(74) *Attorney, Agent, or Firm* — CKC & Partners Co., Ltd.

(57) ABSTRACT

The present invention discloses a data accessing method and an apparatus for performing the method. Through a newly-defined host logical unit (HLUN), a unique HLUN number is given to each LUN-to-LD/Partition mapping relationship, and the HLUN is present to external hosts. Therefore, all of the hosts in the same storage system may recognize different logical units (i.e., HLUN). Hence, when processing an Input/Output (IO) request issued from any one host, a storage virtualization controller (SVC) can correctly find the corresponding LD/Partition for accessing data without identifying the identity of the host.

44 Claims, 14 Drawing Sheets

| HLUN | LD# Partition# |
|---|---|
| ⋮ | ⋮ |

| HLUN | ILUN | | | | | | | |
|---|---|---|---|---|---|---|---|---|
| | 0 | 1 | 2 | 3 | 4 | 5 | 6 | 7 |
| 0 | 0 | 1 | 2 | 3 | 4 | 5 | 6 | 7 |
| 1 | 8 | 9 | 10 | 11 | 12 | 13 | 14 | 15 |
| 2 | 16 | 17 | 18 | 19 | 20 | 21 | 22 | 23 |
| 3 | 24 | 25 | 26 | 27 | 28 | 29 | 30 | 31 |
| 4 | 32 | 33 | 34 | 35 | 36 | 37 | 38 | 39 |
| 5 | 40 | 41 | 42 | 43 | 44 | 45 | 46 | 47 |
| 6 | 48 | 49 | 50 | 51 | 52 | 53 | 54 | 55 |
| 7 | 56 | 57 | 58 | 59 | 60 | 61 | 62 | 63 |
| 8 | 64 | 65 | 66 | 67 | 68 | 69 | 70 | 71 |
| 9 | 72 | 73 | 74 | 75 | 76 | 77 | 78 | 79 |
| 10 | 80 | 81 | 82 | 83 | 84 | 85 | 86 | 87 |
| 11 | 88 | 89 | 90 | 91 | 92 | 93 | 94 | 95 |
| 12 | 96 | 97 | 98 | 99 | 100 | 101 | 102 | 103 |
| 13 | 104 | 105 | 106 | 107 | 108 | 109 | 110 | 111 |
| 14 | 112 | 113 | 114 | 115 | 116 | 117 | 118 | 119 |
| 15 | 120 | 121 | 122 | 123 | 124 | 125 | 126 | 127 |
| 16 | 128 | 129 | 130 | 131 | 132 | 133 | 134 | 135 |
| 17 | 136 | 137 | 138 | 139 | 140 | 141 | 142 | 143 |
| 18 | 144 | 145 | 146 | 147 | 148 | 149 | 150 | 151 |
| 19 | 152 | 153 | 154 | 155 | 156 | 157 | 158 | 159 |
| 20 | 160 | 161 | 162 | 163 | 164 | 165 | 166 | 167 |
| 21 | 168 | 169 | 170 | 171 | 172 | 173 | 174 | 175 |
| 22 | 176 | 177 | 178 | 179 | 180 | 181 | 182 | 183 |
| 23 | 184 | 185 | 186 | 187 | 188 | 189 | 190 | 191 |
| 24 | 192 | 193 | 194 | 195 | 196 | 197 | 198 | 199 |
| 25 | 200 | 201 | 202 | 203 | 204 | 205 | 206 | 207 |
| 26 | 208 | 209 | 210 | 211 | 212 | 213 | 214 | 215 |
| 27 | 216 | 217 | 218 | 219 | 220 | 221 | 222 | 223 |
| 28 | 224 | 225 | 226 | 227 | 228 | 229 | 230 | 231 |
| 29 | 232 | 233 | 234 | 235 | 236 | 237 | 238 | 239 |
| 30 | 240 | 241 | 242 | 243 | 244 | 245 | 246 | 247 |
| 31 | 248 | 249 | 250 | 251 | 252 | 253 | 254 | 255 |

(Host)

FIG. 3A

| HLUN | ILUN | | | | | | | |
|---|---|---|---|---|---|---|---|---|
| | 0 | 1 | 2 | 3 | 4 | 5 | 6 | 7 |
| 0 | 0 | 32 | 64 | 96 | 128 | 160 | 192 | 224 |
| 1 | 225 | 1 | 33 | 65 | 97 | 129 | 161 | 193 |
| 2 | 194 | 226 | 2 | 34 | 66 | 98 | 130 | 162 |
| 3 | 163 | 195 | 227 | 3 | 35 | 67 | 99 | 131 |
| 4 | 132 | 164 | 196 | 228 | 4 | 36 | 68 | 100 |
| 5 | 101 | 133 | 165 | 197 | 229 | 5 | 37 | 69 |
| 6 | 70 | 102 | 134 | 166 | 198 | 230 | 6 | 38 |
| 7 | 39 | 71 | 103 | 135 | 167 | 199 | 231 | 7 |
| 8 | 8 | 40 | 72 | 104 | 136 | 168 | 200 | 232 |
| 9 | 233 | 9 | 41 | 73 | 105 | 137 | 169 | 201 |
| 10 | 202 | 234 | 10 | 42 | 74 | 106 | 138 | 170 |
| 11 | 171 | 203 | 235 | 11 | 43 | 75 | 107 | 139 |
| 12 | 140 | 172 | 204 | 236 | 12 | 44 | 76 | 108 |
| 13 | 109 | 141 | 173 | 205 | 237 | 13 | 45 | 77 |
| 14 | 78 | 110 | 142 | 174 | 206 | 238 | 14 | 46 |
| 15 | 47 | 79 | 111 | 143 | 175 | 207 | 239 | 15 |
| 16 | 16 | 48 | 80 | 112 | 144 | 176 | 208 | 240 |
| 17 | 241 | 17 | 49 | 81 | 113 | 145 | 177 | 209 |
| 18 | 210 | 242 | 18 | 50 | 82 | 114 | 146 | 178 |
| 19 | 179 | 211 | 243 | 19 | 51 | 83 | 115 | 147 |
| 20 | 148 | 180 | 212 | 244 | 20 | 52 | 84 | 116 |
| 21 | 117 | 149 | 181 | 213 | 245 | 21 | 53 | 85 |
| 22 | 86 | 118 | 150 | 182 | 214 | 246 | 22 | 54 |
| 23 | 55 | 87 | 119 | 151 | 183 | 215 | 247 | 23 |
| 24 | 24 | 56 | 88 | 120 | 152 | 184 | 216 | 248 |
| 25 | 249 | 25 | 57 | 89 | 121 | 153 | 185 | 217 |
| 26 | 218 | 250 | 26 | 58 | 90 | 122 | 154 | 186 |
| 27 | 187 | 219 | 251 | 27 | 59 | 91 | 123 | 155 |
| 28 | 156 | 188 | 220 | 252 | 28 | 60 | 92 | 124 |
| 29 | 125 | 157 | 189 | 221 | 253 | 29 | 61 | 93 |
| 30 | 94 | 126 | 158 | 190 | 222 | 254 | 30 | 62 |
| 31 | 63 | 95 | 127 | 159 | 191 | 223 | 255 | 31 |

FIG. 3B

| HLUN | LD# Partition# |
|---|---|
| ...... | ...... |

FIG. 6

| Host ID | Host Number |
|---|---|
| ...... | ...... |

FIG. 5

DATA ACCESSING METHOD AND APPARATUS FOR PERFORMING THE SAME USING A HOST LOGICAL UNIT (HLUN)

RELATED APPLICATIONS

This application claims priority to U.S. Provisional Application Ser. No. 61/171,472, filed Apr. 22, 2009, which is herein incorporated by reference.

BACKGROUND

1. Field of Invention

The present invention relates to a data accessing method and an apparatus for performing the method. More particularly, the present invention relates to a data accessing method and an apparatus which can correctly find the corresponding logical drive for accessing data without identifying an identity of a host when processing an Input/Output (IO) request issued from the host.

2. Description of Related Art

In the modern societies, storage systems/subsystems are widely applied on daily life for meeting various demands. A redundant array of independent disk (RAID) is one of the popular storage subsystems, which can increase data-accessing performance and provide fault-tolerance capability to data besides providing a large amount of storage space. In accordance with different applications, one or more RAIDs can be connected to one or more hosts through host-side interconnect interfaces, thereby integrally forming a storage system. In the storage system, the host accesses data in the RAID to meet the demands of its own application programs.

The RAID is also a storage virtualization subsystem, and the controller therefore is referred to as a storage virtualization controller (SVC), which combines sections of physical storage devices (PSDs) into a logical storage entity by using a storage virtualization technology. The logical storage entity in the RAID is referred to as a logical drive (LD), and the logical storage entity is referred to as a logical unit (LUN) while being mapped out to be accessed by a host.

Hence, from the viewpoint of the host, a host command issued by it is directed to a recognizable LUN. After receiving the host command, the SVC first parses and interprets the host command to determine which logical drive or which partition thereof (referred to as an LD/partition hereinafter) is associated with the LUN to be accessed by the host. Thereafter, the related operation is parameters and data are translated into an IO request targeting a PSD at which the LD/partition is located.

There are two mapping types between the LUN and the logical drive, including global mapping and host-specific mapping. The global mapping indicates that the LD/partition linked to one certain LUN is used for storing global data, i.e., all of the hosts may access data in the LD/partition, wherein the mapping relationship between the LUN and the LD/partition is one-to-one or many-to-one. The host-specific mapping indicates that the LD/partition linked to one certain LUN is used for storing local data, i.e., only some specific hosts may access data in the LD/partition, wherein the mapping relationship between the LUN and the LD/partition is one-to-many, many-to-one or one-to-one. Under the situation of global mapping, the same LUN seen by a plurality of hosts must be mapped to the same LD/partition, i.e., the plurality of hosts may access data in the same LD/partition via the same LUN. In contrast, under the situation of host-specific mapping, although a plurality of hosts, have seen the same LUN, yet in fact, they are mapped respectively to different logical drives (LDs)/partitions via the LUN. When receiving a host IO request issued from a host, a controller determine an LD/partition mapped to the host in accordance with the result of host identity (ID) recognition, such that each of the plurality of hosts merely can access data of its corresponding LD/partition, thereby achieving the object of access control.

Under the situation of host-specific mapping, it is an important issue in the storage industry about how to enable the SVC to correctly map the host commands issued by different hosts to their corresponding LDs/partitions.

SUMMARY

An object of the present invention is to provide an LUN mapping method and an apparatus for performing the method for achieving the efficacy of correctly accessing data without identifying an identity of a host by assigning an exclusive host logical unit (HLUN) to the mapping relationship of each LUN to a logical drive.

According to an aspect of the present invention, a data accessing method is provided for accessing data stored in a storage space, the method including an information-providing step, a receiving step, an interpretation step, a table lookup step, a data-accessing step and a responding step. The information-providing step is performed by a controller for providing a host with host-specific information in accordance with an identity (ID) of the host, thereby responding to at least one first command issued from the host. The receiving step is performed by the controller for receiving an IO request issued from the host. The interpretation step is performed by the controller for interpreting the IO request so as to obtain a logical unit (LUN) number carried by the IO request. The table lookup step is performed by the controller for obtaining a logical drive (LD)/partition associated with the LUN number by looking up in a HLUN-to-LD/Partition mapping table without identifying the identity of the host. The data-accessing step is performed by the controller for accessing data from the LD/partition. The responding step is performed by the controller for responding an execution result of the data-accessing step to the host.

According to another aspect of the present invention, a data accessing method is provided for accessing data stored in a storage space, the method comprising a receiving step, an interpretation step, a table lookup step, a data-accessing step and a responding step. The receiving step is performed by a controller for receiving an IO request issued from a host. The interpretation step is performed by the controller for interpreting the IO request so as to obtain an LUN number carried by the IO request. The table lookup step is performed by the controller for obtaining at least one LD/partition associated with the LUN number by looking up in an HLUN-to-LD/Partition mapping table without identifying an identity of the host. The data-accessing step is performed by the controller for accessing data from the at least one LD/partition. The responding step is performed by the controller for responding an execution result of the data-accessing step to the host, wherein the LUN number is corresponding to a HLUN shown in the HLUN-to-LD/Partition mapping table, and the HLUN is an exclusive number used for representing a mapping relationship associated with a LD/partition.

According to another aspect of the present invention, a data accessing method is provided for accessing data stored in a storage space. In the method, a host issues at least one first command to a controller for requesting the controller to reply host-specific information to the host. In response to the at least one first command, the controller further performs the steps of: looking up in a host-ID table so as to obtain a host number corresponding to the identity of the host; looking up in LUN cross-reference information, or formula converting instead, so as to obtain at least one HLUN assigned to the host number; looking up in LUN cross-reference information and a HLUN-to-LD/Partition mapping table with respect to the at least one HLUN so as to determine if the at least one HLUN has a mapping relationship with at least one LD/partition; and responding to the host one or more of the at least one HLUN that have the mapping relationship with the at least one LD/partition. Then, the host issues an IO request to the controller so as to access the at least one HLUN, and the controller performs data access onto the at least one LD/partition having the mapping relationship with the one or more of the at least one HLUN that have the mapping relationship with the at least one LD/partition, thereby responding to the IO request.

BRIEF DESCRIPTION OF THE DRAWINGS

FIG. 3A and FIG. 3B depict schematic diagrams showing a first embodiment and a second embodiment regarding LUN cross-reference information of the present invention;

FIG. 5 depicts a schematic diagram showing an embodiment of a host-ID table of the present invention;

FIG. 6 depicts a schematic diagram showing an embodiment of an HLUN-to-LD/Partition mapping table of the present invention;

DESCRIPTION OF THE PREFERRED EMBODIMENTS

The present invention is mainly to provide a logical unit (LUN) mapping method and an apparatus for performing the method. In one embodiment, the present invention defines two different logical units (LUNs) to process mapping relationships between LUNs and LDs/partitions in a storage space. The two LUNs are referred to as an internal LUN (ILUN) and a host LUN (HLUN), wherein the ILUN is used for internal recognition in a controller, and the HLUN is externally presented to a host for its recognition. The present invention is suitable for use in global mapping or host-specific mapping between the LUNs and the LDs/partitions. In particular, when the mapping type between the LUNs and the LDs/partitions is the host-specific mapping, the present invention may allow each of the different hosts associated with the same ILUN to have its own exclusive HLUN which is uniquely corresponding to its accessible LD/partition. Consequently, the controller can find the corresponding LD/Partition for accessing data without identifying the identity of a host when processing an IO request issued from the host.

Although the present invention does not need to recognize the identity of the host when processing the IO request issued therefrom, yet the present invention still can make one single LUN (i.e., ILUN) correspond to different LDs/partitions by means of the assistance of HLUN. According to an embodiment of the present invention, let say the host issues an "Inquiry" command, when responding the "Inquiry" command, if the LUN (i.e., the HLUN of the present invention) targeted by the host is listed in the host-specific information, the present invention responds the properties and basic data of the LD/partition corresponding to the HLUN in accordance with standard procedures; otherwise, the present invention replies "unknown or no device type". Consequently, the present invention may make a specific host restrain itself to perform data access only on specific LDs/partitions, such that other non-specific hosts do not perform data access on the specific LDs/partitions automatically through the obstacles established by the method of the present invention. As to the procedures for processing the "Inquiry" command according to the present invention, it will be described later. According to another embodiment, a specific command can be defined proprietarily for performing LUN (i.e., HLUN of the present invention) inquiry, such that, when receiving the specific command, if the LUN (i.e., the HLUN) inquired is listed in the host-specific information, the controller responds the properties and basic data of the LD/partition corresponding to the HLUN in accordance with standard procedures; otherwise, the controller replies "unknown or no device type".

Figure 1A:
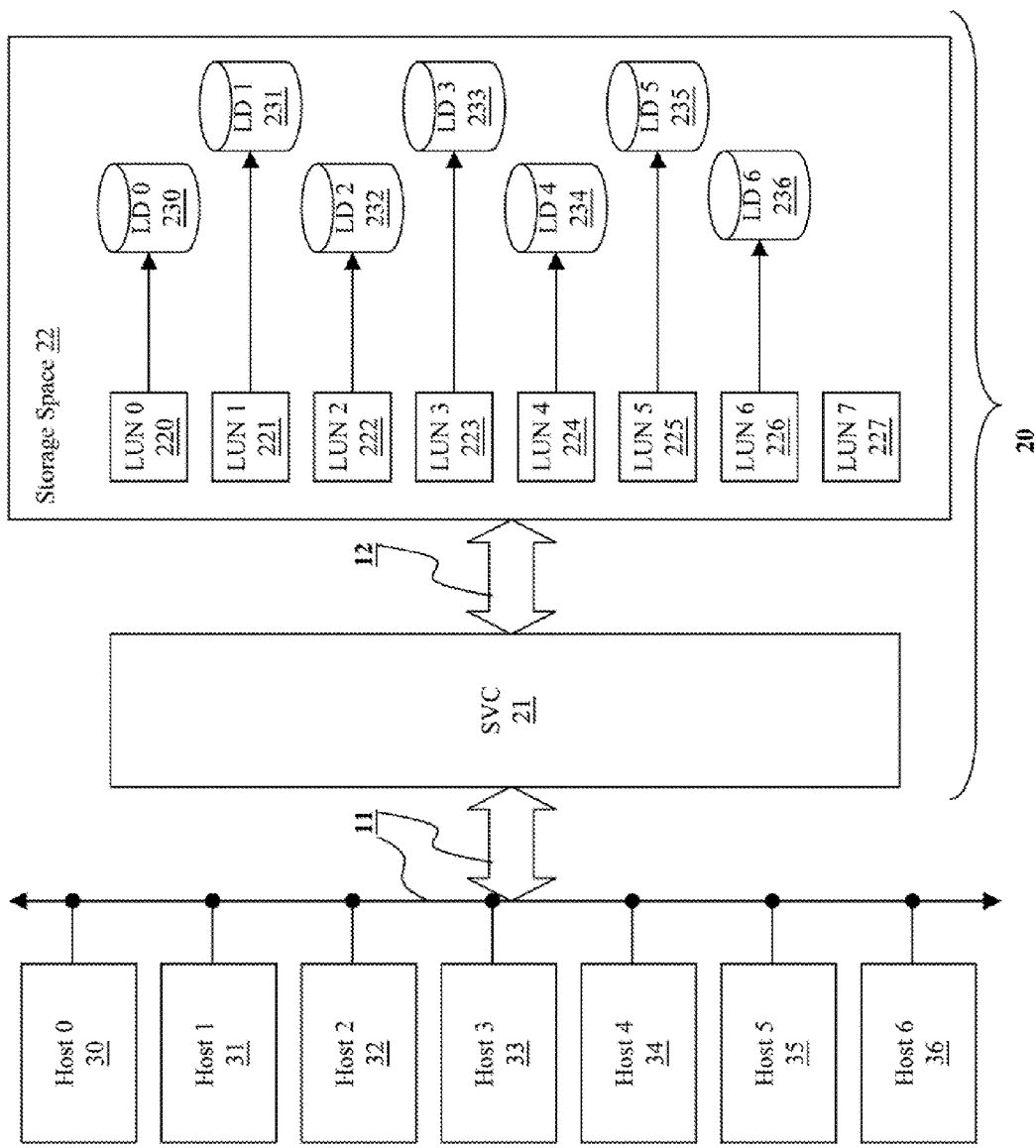
FIG. 1A and FIG. 1B depict schematic diagrams showing a first embodiment and a second embodiment regarding a storage system structure of the present invention.
Figure 1B:
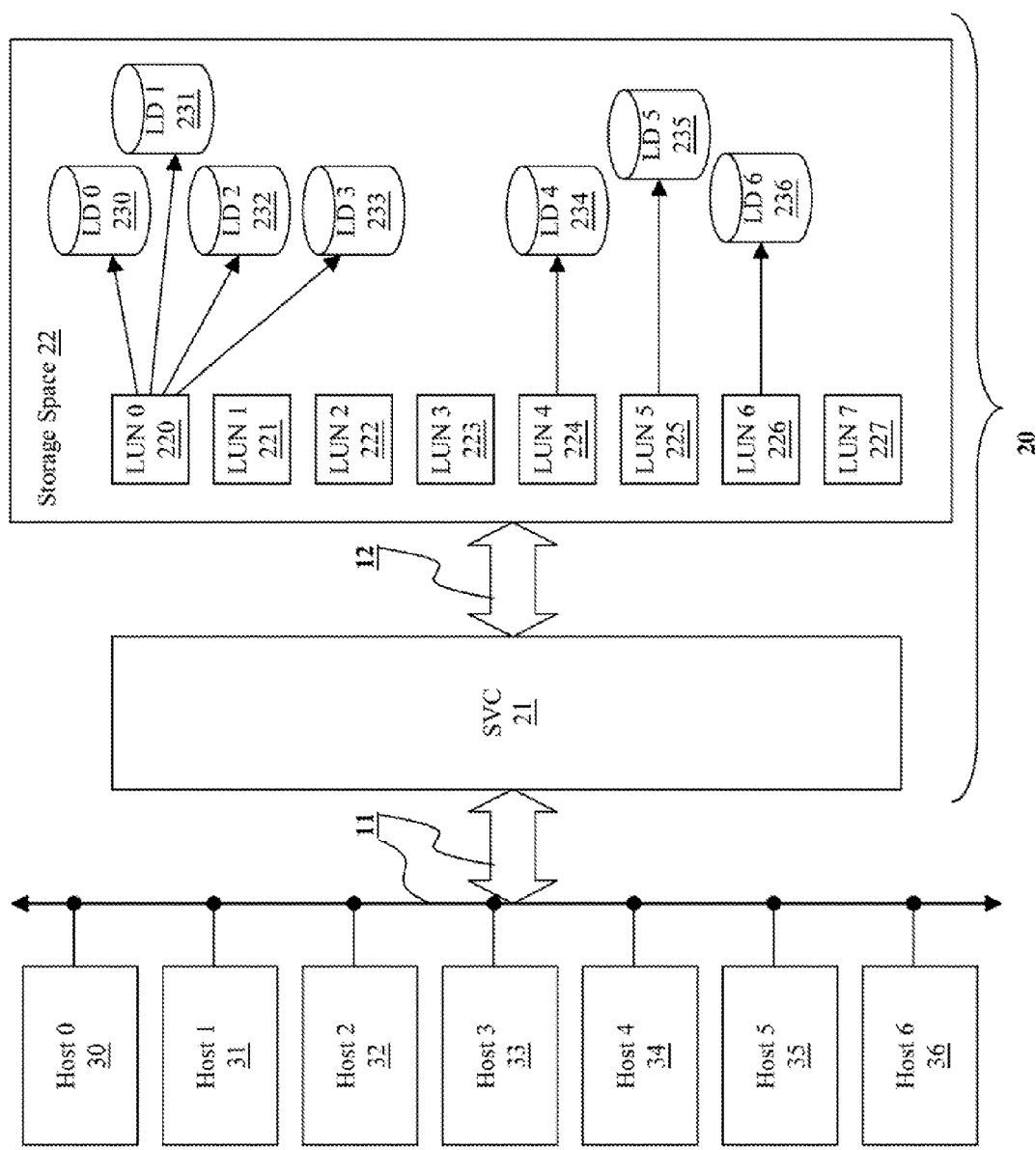

Referring to FIG. 1A and FIG. 1B. FIG. 1A and FIG. 1B depict schematic diagrams showing a first embodiment and a second embodiment regarding a storage system structure of the present invention. Each of these two embodiments includes a plurality of hosts 30-36 and a storage virtualization subsystem (SVS) 20. Data and signal communication is established between the hosts 30-36 and the SVS 20 via a host-side interconnect interface 11. In the present invention, the host-side interconnect interface 11 can be an interface with a communication protocol which can provide a world wide name (WWN) such as fibre channel (FC), serial attached SCSI (SAS) or internet SCSI (iSCSI), etc.; or with another communication protocol which can provide a host ID for recognition.

The hosts 30-36 may be host computers, such as server systems, workstations or personal computers, etc. Although seven hosts 30-36 are shown in the figures in which they are connected to the SVS 20 via the host-side interconnect interface 11, yet in other embodiments, any arbitrary number of hosts (at least one host) can be connected to one or more SVS 20.

The SVS 20 includes a storage virtualization controller (SVC) 21 and a storage space 22 connected to the SVC 21. The storage space 22 may consist of one or more PSD (physical storage device) arrays (not shown). The SVC 21 may be a RAID controller or a JBOD (Just a Bunch of Drives) emulator. The hosts 30-36 may be the storage virtualization controllers (SVCs).

The SVC 21 receives an IO request including the related data (control signals and data signals) from the hosts 30-36, and executes the IO request and maps the IO request to the physical storage devices (PSDs) in the storage space 22 for data access, and then replies response data (if any) to the hosts. The PSDs in the storage space 22 may be various PSDs such as hard disk drives (HDDs), tapes, CD-R/W, digital versatile discs (DVDs) or solid state drives (SSDs). The SVC 21 can be used to enhance efficiency and/or improve data availability or used to increase storage capacity of one single logical media unit viewed by the hosts 30-36.

Figure 2:
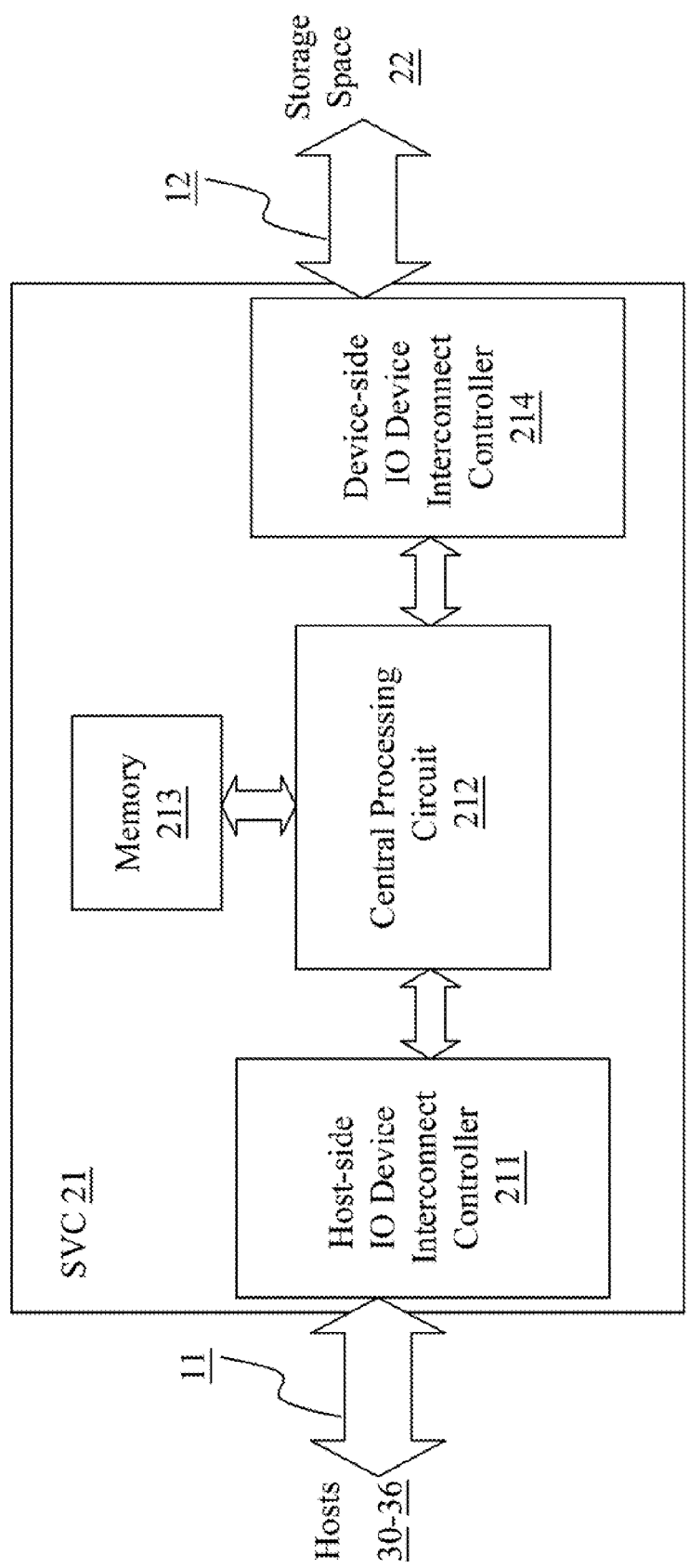
FIG. 2 depicts a schematic diagram showing an embodiment of a SVC using the method of the present invention.

Referring to FIG. 2, which depicts a schematic diagram showing an embodiment of the SVC using the method of the present invention. The SVC 21 includes a host-side IO device interconnect controller 211, a central processing circuit (CPC) 212, a memory 213 and a device-side IO device interconnect controller 214. Although these components are described herein with separate functional blocks, yet on practical applications, part or even all of the functional blocks can be integrated into one single chip.

The host-side IO device interconnect controller 211 is externally connected to the hosts 30-36, via the host-side interconnect interface 11, as an interface and buffer between the SVC 21 and the hosts 30-36; and is internally connected to the CPC 212. The host-side IO device interconnect controller 211 may receive the IO requests and the related data from the hosts 30-36 and converts and transmits them to the CPC 212.

The memory 213 is connected to the CPC 212 as a buffer for buffering data transmitted between the hosts 30-36 and the storage space 22 through the CPC 212. On practical applications, the memory 213 may be a dynamic random access memory (DRAM), and further, the DRAM may be a synchronous dynamic random access memory (SDRAM).

The device-side IO device interconnect controller 214 is externally connected to the storage space 22, via a device-side interconnect interface 12, as an interface and buffer between the SVC 21 and the storage space 22; and is internally connected to the CPC 212. The device-side IO device interconnect controller 214 receives the IO requests and the related data from the CPC 212 and maps and/or transmits them to the storage space 22.

In the present invention, the device-side interconnect interface 12 may be an interface with a communication protocol such as serial ATA (SATA), SCSI, SAS, iSCSI, or FC, etc.

The CPC 212 is an operational kernel of the SVC 21. When receiving a host IO request from the host-side IO device interconnect controller 211, the CPC 212 parses the host IO request and performs some operations to respond the host IO request, and then sends the requested data and/or report and/or information to the hosts 30-36 via the host-side IO device interconnect controller 211 from the SVC 21. The LUN mapping method of the present invention may be implemented by programming codes, wherein the codes may be stored in an internal memory (such as a ROM; not shown) of the CPC 212 or in the external memory 213, for execution by the CPC 212.

Please refer to FIG. 1A again. The SVC 21 may combine and map the respective sections of the PSDs in the storage space 22 into a logical storage device available to the hosts 30-36, referred to as a logical unit (LUN). When the hosts 30-36 issues a host IO request to the SVS 20, the SVC 21 first parses and interprets the host IO request, which includes determining which LD/partition is associated with the LUN to be accessed by the hosts 30-36. Then, the SVC 21 translates the related operation parameters and data into the IO request targeting the PSD at which the LD/partition is located. The LD/partition is constructed by the SVC 21 using the respective sections of the PSDs in the storage space 22 in accordance with RAID or non-RAID (nRAID) or another technology. Since the technologies for constructing the LD/partition are well known to one having ordinary skill in storage industries, they are not described again herein.

In the first embodiment shown in FIG. 1A, it is assumed that the SVS 20 at most may provide eight LUNs, which are LUN0 to LUN7 (reference numbers 220-227), wherein the LUN0 to LUN6 (reference numbers 220-226) are associated with LD0 to LD6 (reference number 230-236) respectively and mapped out to the hosts 30-36, but the LUN7 227 is not associated with an LD. The mapping relationships between the LUNs and the LDs/partitions are described as follows. The mapping type of the LUN0 220 to the LD0 230 is a host-specific mapping, wherein the local data stored in the LD0 230 can only be accessed by the host0 30; the mapping type of the LUN1 221 to the LD1 231 is also a host-specific mapping, wherein the local data stored in the LD1 231 can only be accessed by the host1 31; and the mapping types respectively between the LUN2 to the LUN6 (reference numbers 222-226) and the LD2 to the LD6 (reference numbers 232-236) all are global mappings, so that any host may access the global data stored in any LD from the LD2 to the LD6 (reference numbers 232-236).

In the second embodiment shown in FIG. 1B, it is further assumed that a host-specific mapping relationship is established between one certain LUN and a plurality of LDs/partitions. Similarly, it is assumed that the SVS 20 at most may provide eight LUNs, which are LUN0 to LUN7 (reference numbers 220-227), wherein the LUN0 220, the LUN0 224, the LUN5 225 and the LUN6 226 each are associated with one or more LDs/partitions and are mapped out to the hosts 30-36. More specifically, the mapping type between the LUN0 220 and the LDs/partitions is a one-to-many host-specific mapping. Namely, a first host (such as host0 30) is associated with the LD0 230 via the LUN0 220; a second host (such as host1 31) is associated with the LD1 231 via the LUN0 220; a third host (such as host2 32) is associated with the LD2 232 via the LUN0 220; and a fourth host (such as host3 33) is associated with the LD3 233 via the LUN0 220. Since the SVS 20 does not map the LUN0 220 to the other hosts except the aforementioned first to fourth hosts, the other hosts (such as host4 34, host5 35 and host6 36) will not perform data access on any of the LD0 230, the LD1 231, the LD2 232 and the LD3 233 via the LUN0 220 under normal situations. In contrast, since the mapping types between the LUN4 224, the LUN5 225, the LUN6 226 and the LDs/partitions all are the global mappings, any of the host 30-36 may access data from the LD4 234, the LD5 235 and the LD6 236 via the LUN4 224, the LUN5 225 and the LUN6 226, respectively.

No matter which embodiment of FIG. 1A or FIG. 1B is considered, since the hosts 30-36 can only recognize the LUNs presented by the SVS 20, the messages carried by the host IO requests are merely limited to the description of accessing data in specific LUNs (such as the LUN0 220). As to which LD/partition to which the host IO request is translated, it is determined by the SVC 21 located therebetween for communication.

In order for the SVC 21 to correctly interpret the host IO request to be correctly corresponding to the LD/partition, thereby accessing correct data for responding to the host issuing the host IO request. The present invention defines a new logic unit referred to as a host LUN (HLUN) used for exclusively representing the mapping relationship between each LUN and the LD/partition. Further, in the present invention, the LUN originally used in the SVC 21 is referred to as an ILUN. According to the technology of the present invention, the ILUN is reserved for recognition when internal data are converted, and instead, the HLUN is used as the LUN presented to the hosts externally.

According to an embodiment of the present invention, before issuing the IO requests to the SVS 20 at the first time, the hosts 30-36 first issue "Report LUNs" and "Inquiry" commands to inquire which devices are accessible and inquire about the basic data regarding the types and properties of the devices. The "Report LUNs" and "Inquiry" commands are standard commands under SCSI specification, and are well known to those who are skilled in the art, and thus are not described herein.

According to the technology of the present invention, when any host issues the "Report LUNs" and "Inquiry" commands to inquire the accessible LUNs and their basic properties, the SVC 21 has to be able to assign a unique number to each host corresponding to each ILUN, that is, an HLUN used for representing such unique mapping relationship. In other words, the ILUN can be considered as an index for the host that looks up in LUN information. As to the "Report LUNs" and "Inquiry" commands, they are commonly used in SCSI interface. Briefly speaking, the "Report LUNs" command is used to require a target side receiving the command to reply which LUNs are available for use at initiator side; and the "Inquiry" command is issued to the LUN from the initiator side for inquiring the basic data of a specific LUN. As to the detailed contents of these commands, they are well known to those who are skilled in the art, and thus are not described herein.

There are several different implementation methods regarding how to allocate a unique HLUN number of each ILUN accessible to each host which makes an inquiry. The SVC 21 may select a fixed allocation method or a dynamic allocation method, as long as each host can be given a unique HLUN number for corresponding to each ILUN. Therefore, any method that provides a host with a unique HLUN number for corresponding to an ILUN is considered not departing from the spirits of the present invention.

In the aforementioned fixed allocation method, LUN cross-reference information can be established in the beginning of configuring the storage system, which is used to record the corresponding relationships between the ILUNs and the HLUNs. In other embodiment of the present invention, if the corresponding relationships between the ILUNs and the HLUNs follow a specific rule, the LUN cross-reference information also can be replaced by only recording the specific rule for conversion use. Referring to FIG. 3A and FIG. 3B, which depict schematic diagrams showing a first embodiment and a second embodiment regarding the LUN cross-reference information of the present invention. In the two embodiments, it is assumed that the SVS 20 is configured to use one byte for storing LUN numbers, i.e., 0-255; and it is assumed that it is sufficient for a storage system to use eight ILUNs (i.e., ILUN0 to ILUN7). Therefore, since 256/8=32, it means that the storage system can support the connections to 32 host computers, and the mapping relationships of each host computer supported corresponding to eight ILUNs each has an exclusive HLUN number. Although, FIG. 3A and FIG. 3B both assume using the data length of one byte for storing LUN numbers, that is, 256 numbers being used as HLUN numbers, and it is also assumed that there are eight ILUNs, yet other embodiments of the present invention should not be limited thereto. The data length for storing the HLUN can be any arbitrary length smaller than or larger than one byte, and the quantity of the ILUNs may be also any arbitrary number smaller than or larger than "eight".

Using FIG. 3A as an example for explanation, the HLUN numbers sequentially allocated to the mapping relationships of the host0 to the respective ILUN0-ILUN7 are "0" to "7". Similarly, the HLUN numbers sequentially allocated to the mapping relationships of the host1 to the respective ILUN0-ILUN7 are "8" to "15". The rest of the HLUN numbers are allocated in the similar way, wherein the mapping relationships of the host31 to the respective ILUN0-ILUN7 are "248" to "255".

In the two embodiments of the LUN cross-reference information shown in FIG. 3A and FIG. 3B, all of the possible HLUN numbers are defined in advance. However, perhaps not all of these numbers will be used, and these numbers are merely prepared in case of need. For example, if the mapping type of one certain ILUN to its mapped LD/partition is the global mapping, the mapping relationship may be represented by using only one HLUN number. Usually, a number of the minimum value is chosen for representing the HLUN numbers of all of the hosts to the ILUN. For example, as the embodiment shown in FIG. 3A, when under the global mapping, "0" is chosen as the representing HLUN number for the mapping relationships of all of the hosts to the ILUN0, and similarly, "1" to "7" are chosen as the representing HLUN numbers respectively for the mapping relationships of all of the hosts corresponding to the ILUN1 to the ILUN7, and so is the embodiment shown in FIG. 3B. Certainly, in other embodiments, it is not necessary to choose the number with the minimum value as the representing HLUN number corresponding to all of the hosts when under the global mapping. As long as the mapping relationship of each LUN to each LD/partition can be uniquely represented, other allocation methods should be considered not departing from the spirits of the present invention.

As to the dynamic allocation method, it can allocate different amounts of HLUNs to different hosts. If it is also assumed that the data length for storing the HLUN number is 1 byte, there are 256 numbers able to be used as HLUN numbers. However, the difference between the dynamic allocation method and the fixed allocation methods shown in FIG. 3A and FIG. 3B is that, a user may allocate different numbers of HLUNs to different hosts in accordance with application needs, as long as the total quantity of the HLUNs allocated to all of the hosts does not exceed 256.

Figure 4B:
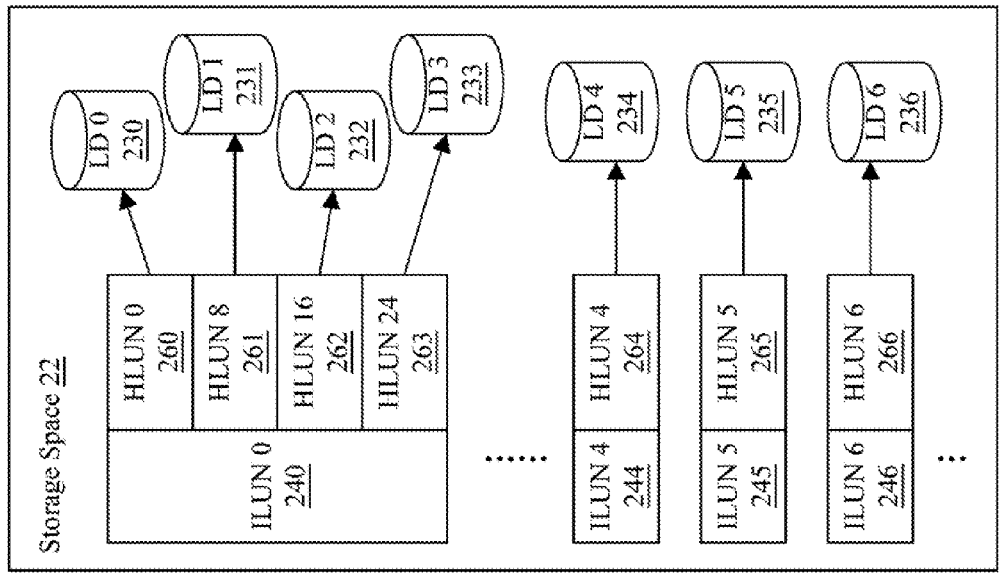
FIG. 4A and FIG. 4B depict schematic diagrams showing mapping relationships of LUNs to LDs/partitions according to the structures shown in FIG. 1 and FIG. 2 with reference to the embodiment of LUN cross-reference information shown in FIG. 4A.
Figure 4A:
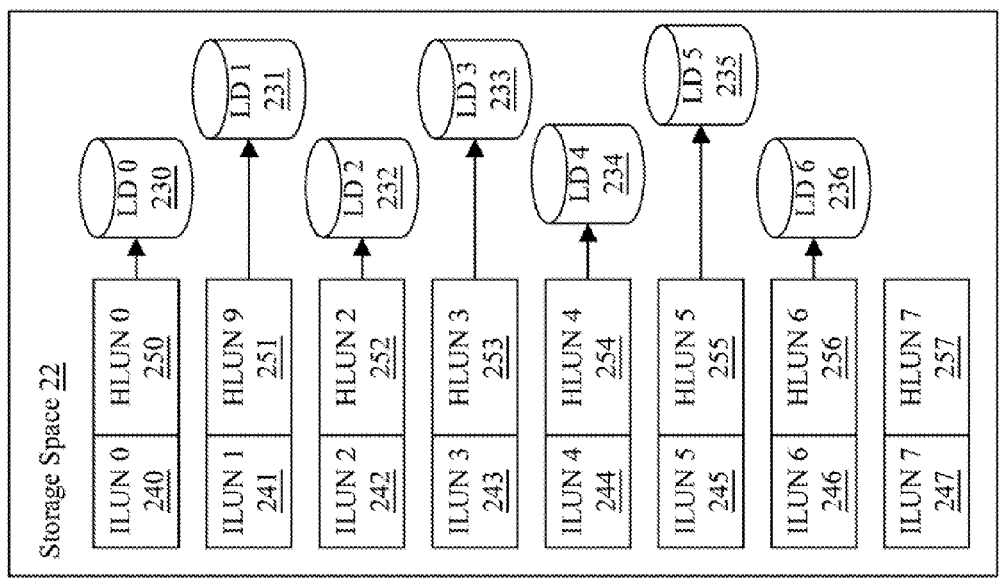

Referring to FIG. 4A and FIG. 4B, which depict schematic diagrams showing the mapping relationships of the LUNs to the LDs/partitions in accordance with the respective structures shown in FIG. 1A and FIG. 1B with reference to the embodiment of the LUN cross-reference information shown in FIG. 3A.

In FIG. 4A, it can be known by looking up in FIG. 3A that, the number of the HLUN associated with the ILUN of which the number is "0" and the host of which the number is "0" is "0", and thus the original relationship of the LUN0 220 to the LD0 230 is represented by a HLUN0 250. Also, it can be known by looking up in FIG. 3A that the number of the HLUN associated with the ILUN of which the number is "1" and the host of which the number is "1" is "9", and thus the original relationship of the LUN1 221 to the LD1 231 is represented by a HLUN9 251. However; since the mapping types of LUN2-LUNG (reference numbers 222-226) respectively to LD2-LD6 (reference numbers 232-236) are all the global mapping, when looking up in the table, the host numbers can be omitted, and only the representing HLUN number representing the ILUN needs to be found. Accordingly, in FIG. 4A, the LUN2 222 originally shown in FIG. 1A is referred to as an ILUN2 242, and its mapping relationship with the LD2 232 is represented by a HLUN2 252. Similarly, the original LUN3 223 is referred to as an ILUN3 243, and its mapping relationship with the LD3 233 is represented by a HLUN3 253. Similarly, the original LUN4 224 is referred to as an ILUN4 244, and its mapping relationship with the LD4 234 is represented by a HLUN4 254. Similarly, the original LUN5 225 is referred to as an ILUN5 245, and its mapping relationship with the LD5 235 is represented by a HLUN5 255. Similarly, the original LUN6 226 is referred to as an ILUN6 246, and its mapping relationship with the LD6 236 is represented by a HLUN6 256.

As to FIG. 4B, it can be known by looking up in FIG. 3A and obtained in the similar way that, the original LUN0 220 is referred to as the ILUN0 240, and its mapping relationship corresponding to the LD0 230 is represented by a HLUN0 260, and its mapping relationship corresponding to the LD1 231 is represented by a HLUN8 261, and its mapping relationship corresponding to the LD2 232 is represented by a HLUN16 262, and its mapping relationship corresponding to the LD3 233 is represented by a HLUN24 263. Similarly, the original LUN4 224 is referred to as the ILUN4 244, and its mapping relationship corresponding to the LD4 234 is represented by a HLUN4 264. Similarly, the original LUN5 225 is referred to as the ILUN5 245, and its mapping relationship corresponding to the LD5 235 is represented by a HLUN5 265. Similarly, the original LUN6 226 is referred to as the ILUN6 246, and its mapping relationship corresponding to the LD6 236 is represented by a HLUN6 266. The HLUN0 260, the HLUN8 261, the HLUN16 262 and the HLUN24 263 are the HLUNs derived under the same ILUN structure, i.e., the ILUN0 240.

In the above description, the HLUN number uniquely corresponding to each mapping relationship is obtained by "looking up" in the LUN cross-reference information shown in FIG. 3A. However, in other embodiments of the present invention, if the HLUN numbers of the respective ILUNs corresponding to different hosts are configured following certain rules, then the HLUN numbers may be obtained by conversion using specific formulae. In other words, the conversion method can be used to replace the table lookup method for obtaining a unique HLUN number exclusively corresponding to a specific mapping relationship.

Figures 5, 6:
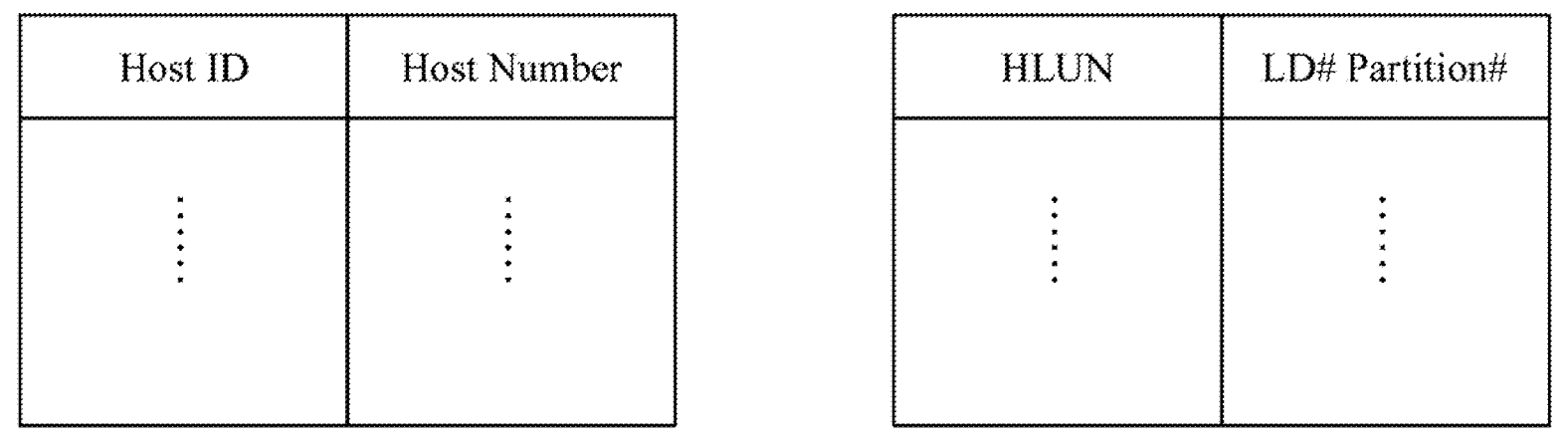

Referring to FIG. 5, which depicts a schematic diagram showing an embodiment of a host-ID table of the present invention. The host-ID table records the information of host numbers corresponding to host IDs, wherein the SVC 21 assigns a host number to each hosts connected. During the operation of the SVS 20, a user may perform configuration setup onto the SVC 21 via a user interface at any time in accordance with needs, thereby establishing the host-ID table for recording the data of host IDs of the hosts currently on-line associated with the host numbers. If a new host is added thereafter, in general, the user still needs to perform the configuration setup via the user interface so as to assign a new host number to the newly-added host and to record its related information.

Referring to FIG. 6, which depicts a schematic diagram showing an embodiment of an HLUN-to-LD/Partition mapping table of the present invention, wherein the information of an LD/partition mapped to each HLUN is recorded. During the operation of the SVS 20, a user may perform configuration setup onto the SVC 21 via a user interface at any time in accordance with needs, thereby establishing the HLUN-to-LD/Partition mapping table. If a new host is added thereafter, in general, the user still needs to perform the configuration setup via the user interface to update the information recorded in the HLUN-to-LD/Partition mapping table.

Figure 7:
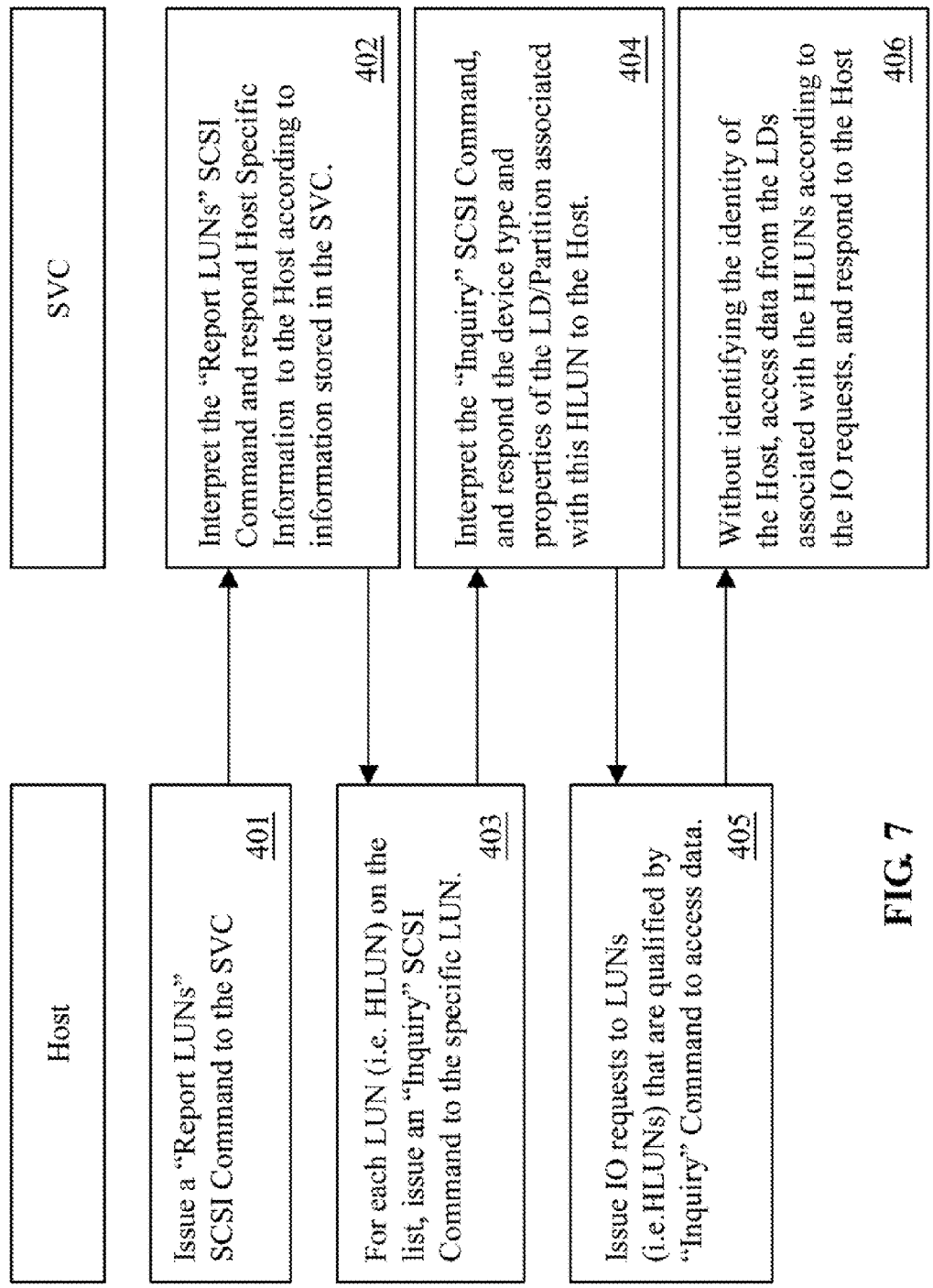
FIG. 7 depicts a flow chart showing an embodiment of processing procedures executed between a host and a SVC when the present invention is implemented.

Referring to FIG. 7, which depicts a flow chart showing an embodiment of processing procedures executed between a host and a SVC when the method of the present invention is implemented. The embodiment shown in FIG. 7 is merely a typical and simplified scheme. In other embodiments of the present invention, the sequence of the steps shown in FIG. 7 may be changed, and the number of times of the "Report LUNs" and "Inquiry" commands issued by a host is not limited to one time for each. Hereinafter, the steps in FIG. 7 are described in detail by taking the structure shown in FIG. 1B and FIG. 4B as an example.

In step 401, a host (such as the host0 30) issues a "Report LUNs" command to the SVC 21.

In step 402, the SVC 21 interprets the "Report LUNs" command, and then responds host-specific information to the host (such as the host0 30) in accordance with internal settings and stored information, wherein the host-specific information has recorded the information of LUNs (such as HLUN0 260, HLUN4, 264, HLUN5 265 and HLUN6 266) configured to be accessed by the host.

Figure 8:
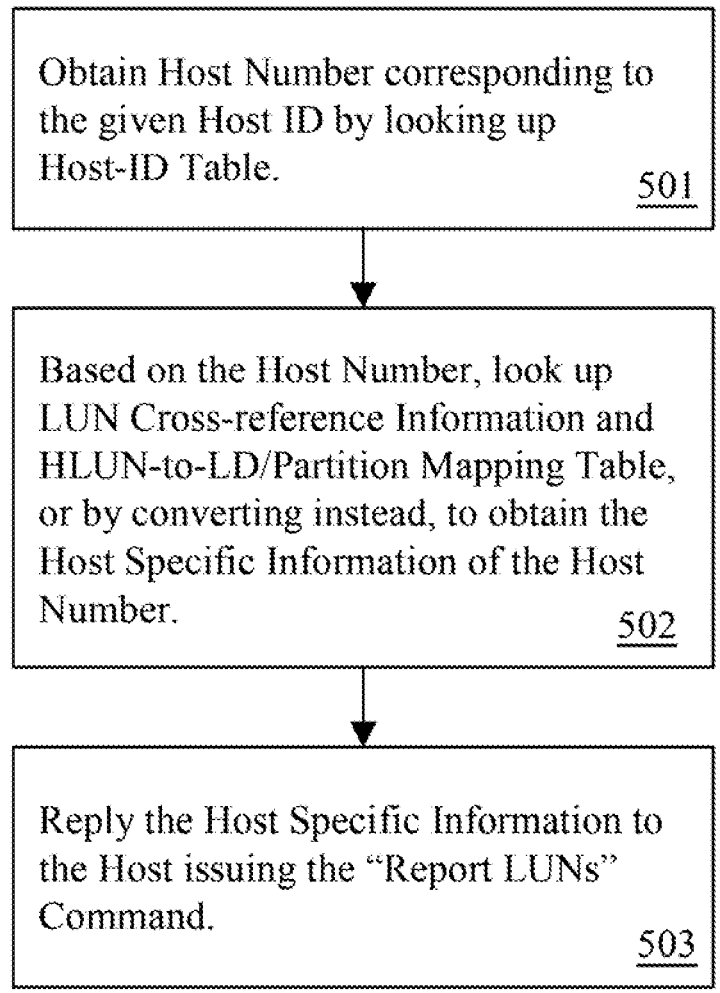
FIG. 8 depicts a flow chart showing an embodiment of the present invention regarding processing a "Report LUNs" command shown in FIG. 7.

In the aforementioned step 402, please refer to FIG. 8 for the detailed contents regarding the "Report LUNs" command processed by the SVC 21. At first, step 501 is performed to look up in the host-ID table (such as shown in FIG. 5), thereby obtaining a host number (for example, "0" and shown as "host0" in the present invention) internally used in the SVS 20 and corresponding to the host ID of the host issuing the command. In other embodiments of the present invention, the host issuing the command may be newly added (just on-line) and the user does not configure it to the host-ID table yet, and thus the inquiry result of step 501 also can be: no host number corresponding to the host ID. Based on the result obtained in step 501, step 502 is performed to obtain the host-specific information by looking up in the LUN cross-reference information (such as shown in FIG. 3A and FIG. 3B) and in the HLUN-to-LD/partition mapping table (such as shown in FIG. 6), or by formula converting instead; wherein the host-specific information records all of the LUNs (i.e. HLUNs) accessible to the host. In step 503, the SVC 21 replies the host-specific information to the host issuing the "Report LUNs" command.

Figure 11A:
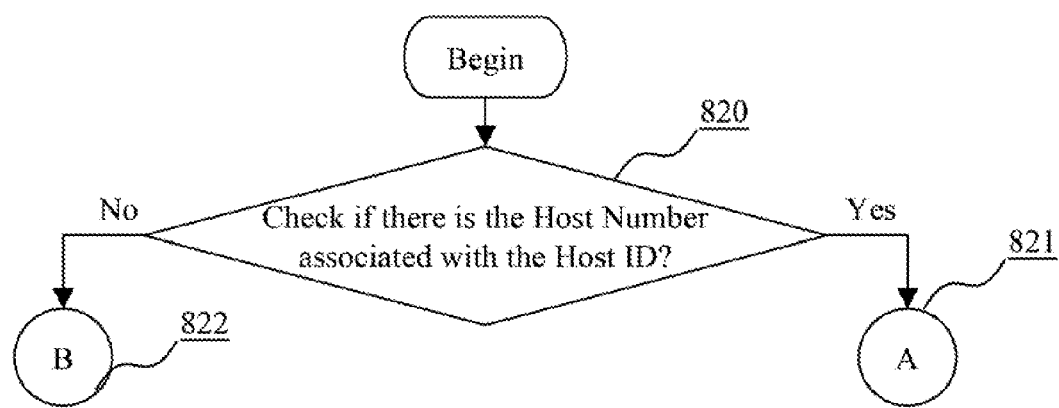
FIG. 11A to FIG. 11C depict a flow chart showing an embodiment of the present invention regarding host-specific information of a host obtained by looking up the LUN cross-reference information and the HLUN-to-LD/Partition mapping table.
Figure 11B:
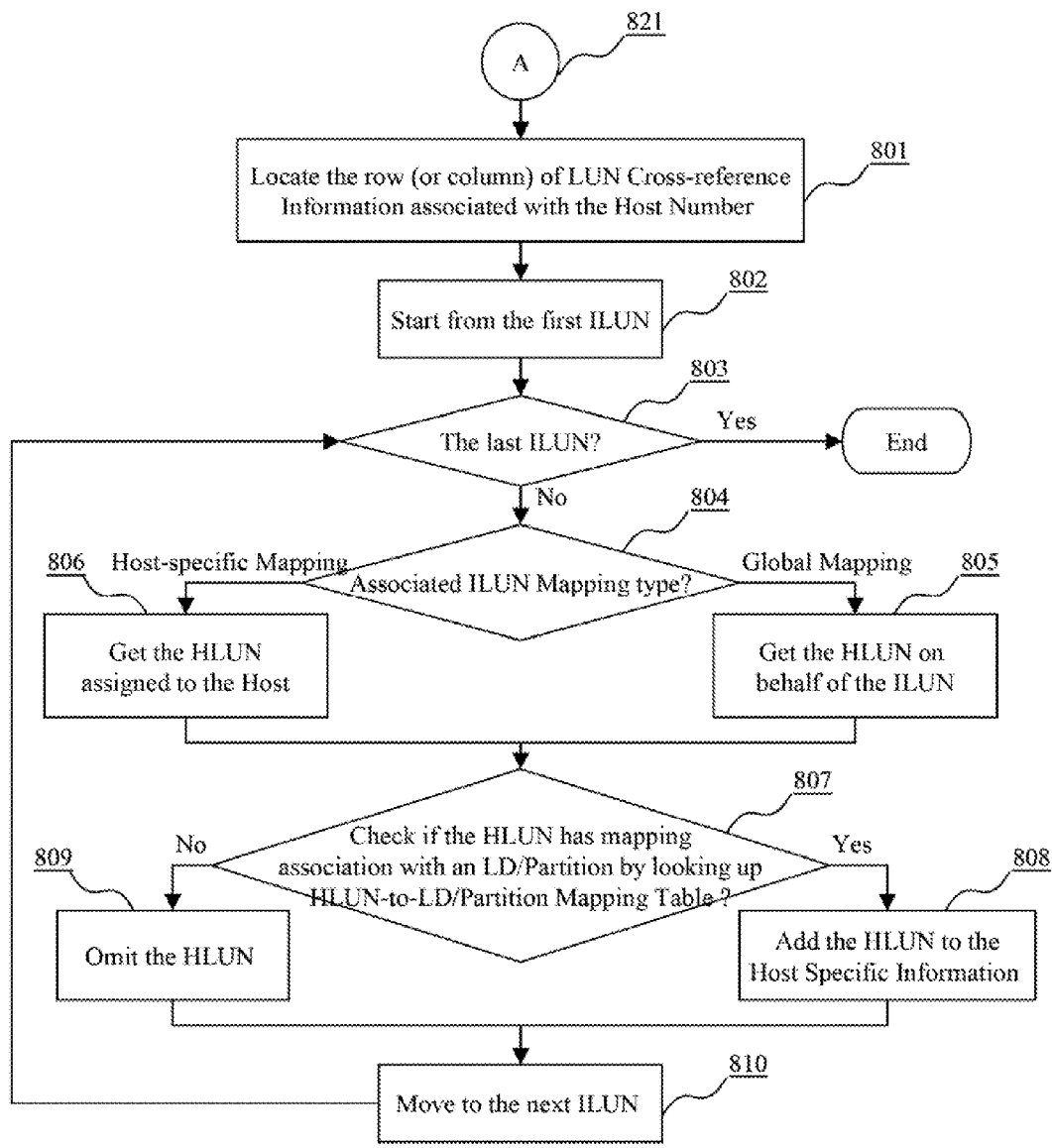
Figure 11C:
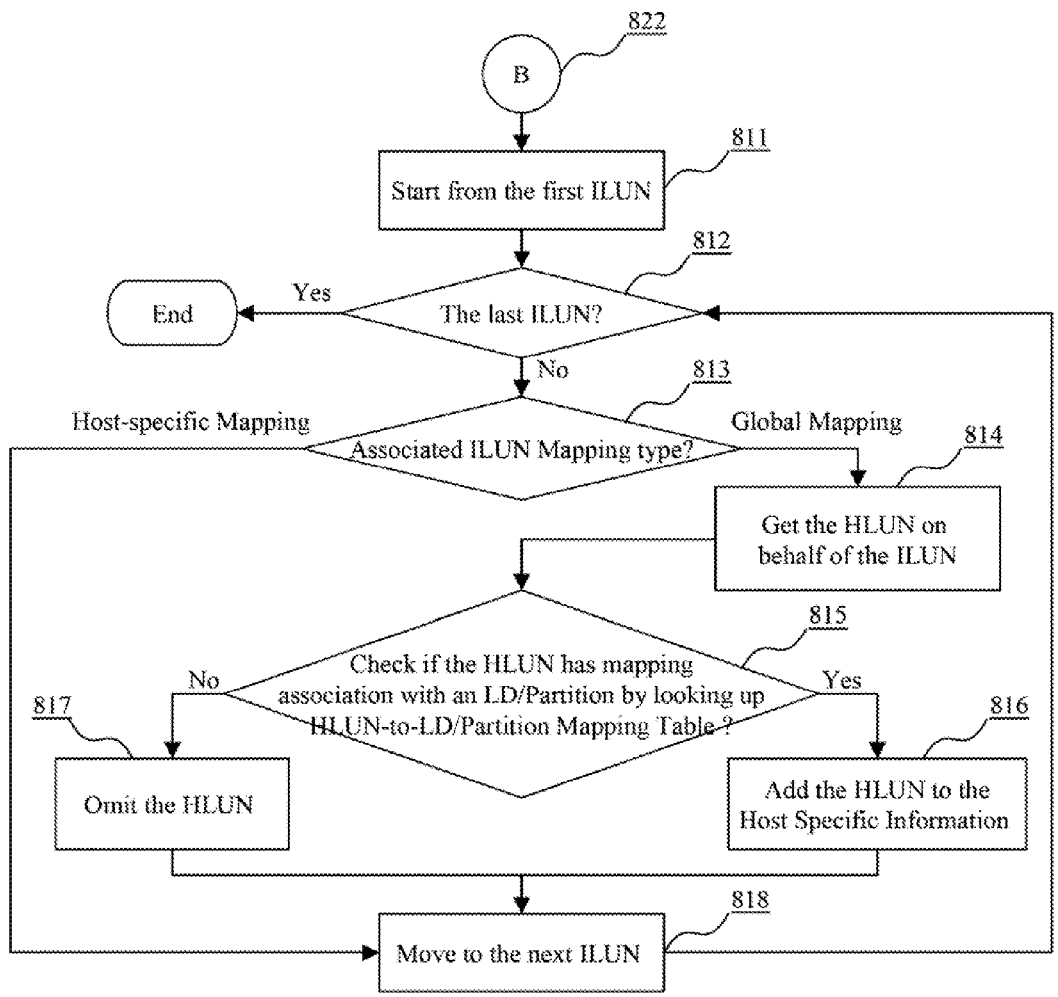

As to step 502 in FIG. 8 regarding how to obtain the host-specific information, the detailed contents thereof are shown in FIG. 11A to FIG. 11C.

At first, referring to FIG. 11A, step 820 is performed to check/to determine if the host number associated with the host ID of the host issuing the command is found in the host-ID table. If the check/determination result of step 820 is YES, the procedure proceeds to the steps shown in FIG. 11B via a connection point A (step 821); if the determination result of step 820 is NO, the procedure proceeds to the steps shown in FIG. 11C via a connection point B (step 822).

Referring to FIG. 11B, after entering this procedure via the connection point A, step 801 is first performed to locate the HLUN data row (or column) associated with the aforementioned host number in the LUN cross-reference information. In step 802, the ILUN is used as an index for confirmation started from the first ILUN. Step 803 is performed to determine if the ILUN currently processed is the last ILUN. If the determination result of step 803 is YES, this procedure is ended; otherwise, step 804 is performed. In step 804, the procedure goes to look up the mapping type associated with the ILUN currently processed. If the recorded mapping type associated with the ILUN is a global mapping, step 805 is performed to select the HLUN on behalf of the ILUN. If the recorded mapping type associated with the ILUN is a host-specific mapping, step 806 is performed to reserve the HLUN originally assigned to the host. In step 807, the procedure goes to check if the selected HLUN has a mapping relationship (or mapping association) with a logical drive (LD)/partition by looking up in the HLUN-to-LD/partition mapping table in accordance with the selected HLUN obtained in step 805 or step 806. If the determination result of step 807 is YES, step 808 is performed to add the selected HLUN to the host-specific information; otherwise, step 809 is performed to omit the selected HLUN. In step 810, the target to be confirmed is moved to the next ILUN, and then the procedure returns to step 803 and performs the subsequent steps again.

Please refer to FIG. 11C. If this procedure is entered via the connection point B (step 822), it means that the host ID of the host issuing the command cannot be found by looking up in the host-ID table, and thus there is no associated host number. Under this situation, in an embodiment, the SVC 21 allows the host to access the LDs/partitions having global mapping relationships with the ILUNs, i.e., the LDs/partitions in which the global data are stored. At first, step 811 is performed to use the ILUN as a search index for confirmation started from the first ILUN. Step 812 is performed to determine if the ILUN currently processed is the last ILUN. If the determination result of step 812 is YES, this procedure is ended; otherwise, step 813 is performed to find what the mapping type associated with the ILUN currently processed is. If the recorded mapping type associated with the ILUN is the global mapping, step 814 is performed to select the HLUN on behalf of the ILUN. If the recorded mapping type associated with the ILUN is the host-specific mapping, it is omitted and the process flow skips to step 818 for moving the target to be confirmed to the next ILUN. After step 814, step 815 is performed to determine if the selected HLUN has a mapping relationship (or mapping association) with an LD/partition by looking up in the HLUN-to-LD/partition mapping table in accordance with the selected HLUN. If the determination result of step 815 is YES, step 816 is performed to add the HLUN number to the host-specific information; otherwise, step 817 is performed to omit the HLUN number. In step 818, the target to be confirmed is moved to the next ILUN, and the process flow returns to step 812 and then performs the subsequent steps again.

Hereinafter, the case in which the host number can be found is used as an example for explanation. Please refer to FIG. 1B, FIG. 3, FIG. 4B and FIG. 11A to FIG. 11B simultaneously. Assume that the host making an inquiry is the host1 31, and it is assumed that, after looking up in the host-ID table, it can be known that the host number of the host1 31 internally used in the SVS 20 is "1". Therefore, based on the host number of "1", it can be obtained by looking up in the LUN cross-reference information that all of the HLUN numbers reserved and assigned to the host1 31 by the system are "8", "9", "10", "11", "12", "13", "14" and "15", which are represented as "HLUN8", "HLUN9", "HLUN10", "HLUN11", "HLUN12", "HLUN13", "HLUN14" and "HLUN15". Thereafter, started from the first HLUN8, a step is performed to find what the mapping type of the ILUN0 associated with the HLUN8 is. It can be known from FIG. 1B that the ILUN0 has the host-specific mapping type, and thus the HLUN8 is reserved. Then, a step is performed to further confirm if the HLUN8 has a mapping relationship with an LD by looking up in the HLUN-To-LD/partition mapping table. It can be known from FIG. 4B that the HLUN8 261 is mapped to the LD1 231, and thus the HLUN8 is added to the host-specific information of the host1 31. Thereafter, the step is moved to the next HLUN9 to find what the mapping type of the ILUN1 associated with the HLUN9 is. It is assumed that the mapping type is the global mapping, and thus the HLUN1 representing the ILUN1 is selected to replace the HLUN9. Then, a step is performed to check if the HLUN1 has a mapping relationship with a LD by looking up in the HLUN-to-LD/partition mapping table. It can be known from FIG. 1B that the LUN1 221 (i.e., ILUN1) associated with the HLUN1 does not have any mapping relationship with any LD, and thus the HLUN1 is omitted. Then, the step is further moved to the next HLUN10 and repeats the above operations. When the process flow proceeds to the procedure of confirming the HLUN12, it can be known that the mapping type of the ILUN4 associated with the HLUN12 is configured as the global mapping, and thus the HLUN4 representing the ILUN4 is selected to replace the HLUN12, and the HLUN4 264 has a mapping relationship with the LD4 234, so that the HLUN4 is added to the host-specific information of the host1 31. Similar operations are performed for the other HLUNs. After all of the HLUNs have been checked, the host-specific information of the host1 31 including "HLUN8", "HLUN4", "HLUN5", "HLUN6" is accordingly obtained.

Referring to FIG. 7 again, in step 403, the host (such as the host0 30) further issues an "Inquiry" command to one or each of its accessible LUNs (such as the HLUN0 250, the HLUN4 254, the HLUN5 255 and the HLUN6 256).

In step 404, the SVC 21 interprets the "Inquiry" command received, and thus it can be known that the LD/partition uniquely corresponding to the HLUN to which the "Inquiry" command is directed, for example, the HLUN0 250 corresponding to the LD0 230, the HLUN4 254 corresponding to the LD4 234, the HLUN5 255 corresponding to the LD5 235, the HLUN6 256 corresponding to the LD6 236. Then, the basic data, such as the device types and properties, of the LD/partition are replied to the host (such as the host0 30).

Figure 9:
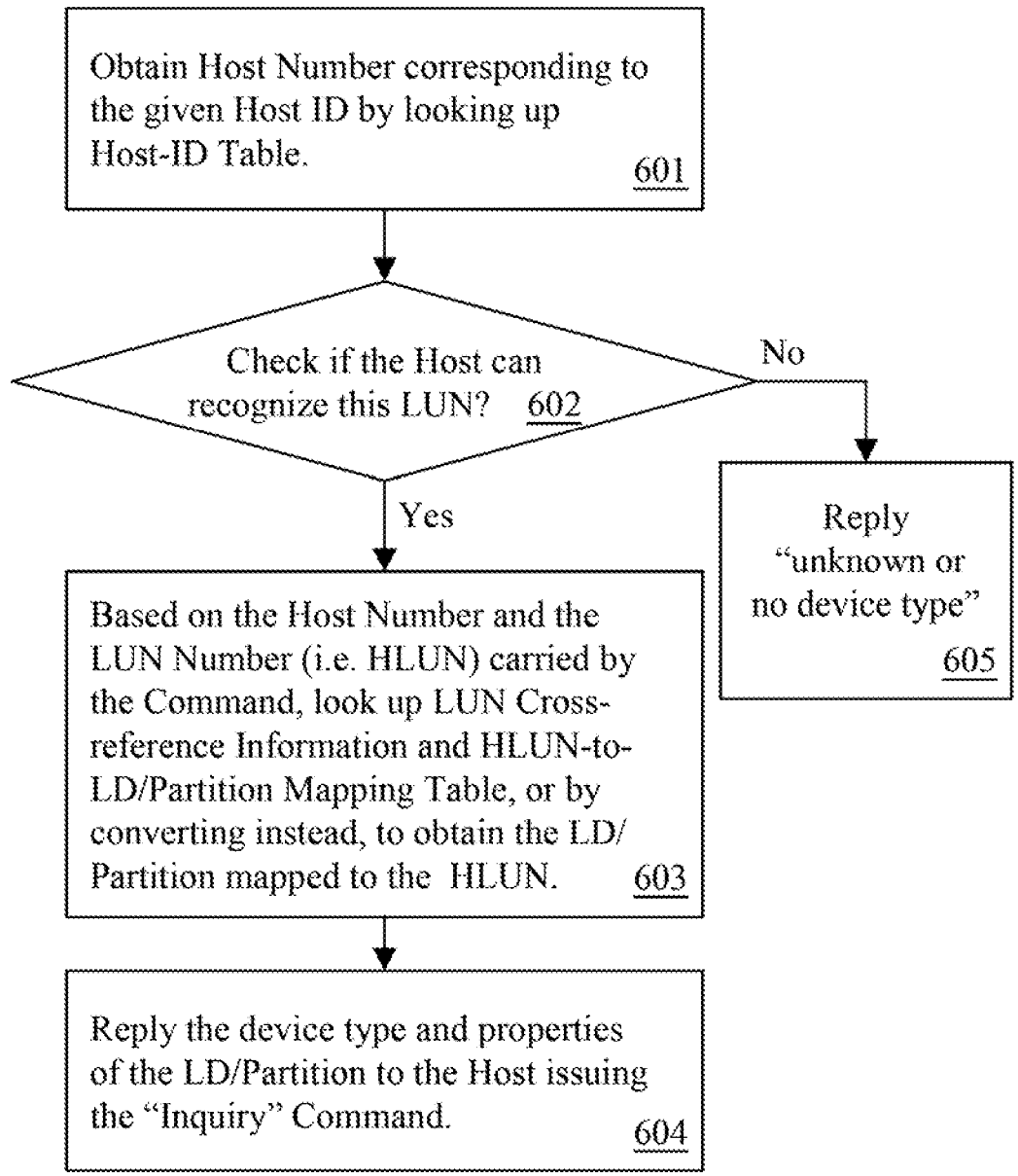
FIG. 9 depicts a flow chart showing an embodiment of the present invention regarding processing an "Inquiry" command shown in FIG. 7.

In the aforementioned step 404, please refer to FIG. 9 for the detailed contents regarding the "Inquiry" command processed by the SVC 21. At first, step 601 is performed to obtain the host number (such as "0" which is represented as "host0" in the present invention) corresponding to the host ID of the host issuing the command and being internally used in the SVS 20 by looking up in the host-ID table shown in FIG. 5. Similarly, in other embodiments of the present invention, the host may be newly added (just on-line), and the user has not configured the host ID to the host-ID table yet, and thus the inquiry result of step 601 may be: no host number corresponding to the host ID. Based on the inquiry result of step 601 and the target LUN number recorded in the "Inquiry" command, Step 602 is performed to check if the host can recognize the LUN by looking up in the LUN cross-reference information and looking up in the HLUN-to-LD/partition mapping table (or by formula converting instead). The aforementioned statement of "if the host can recognize the LUN" means whether the LUN (i.e. HLUN) exists in the host-specific information of the host. Hence, the aforementioned procedures shown in FIG. 11A to FIG. 11C have to be performed to provide comparison for checking "if the host can recognize the LUN". The detailed contents of FIG. 11A to FIG. 11C have been described in the above, and therefore will not be described again herein. If the checking result of step 602 is NO, step 605 is performed to reply to the host that the device inquired thereby is unknown or has no device type. If the checking result of step 602 is YES, step 603 is performed to learn what the LD/partition mapped to the target LUN (the HLUN of the present invention) is by looking up in the LUN cross-reference information and the HLUN-to-LD/partition mapping table or by formula converting instead. Thereafter, step 604 is performed to reply to the host the device type and properties of the LD/partition mapped to the target LUN.

Referring to FIG. 7 again, after the aforementioned steps, the host (such as the host0 30) knows which LUNs (the HLUNs replied by the SVC 21) are accessible and what properties of the LUNs are. Accordingly, in step 405, the host (such as the host0 30) can issue IO requests to any of the given LUNs (such as the HLUN0 250, the HLUN4 254, the HLUN5 255 and the HLUN6 256) for accessing data.

In step 406, the SVC 21 can know the LD/partition associated with the IO request merely in accordance with the HLUN information carried by the IO request received without identifying the identity of the host, so that the SVC 21 can directly access data from the LD/partition.

Figure 10:
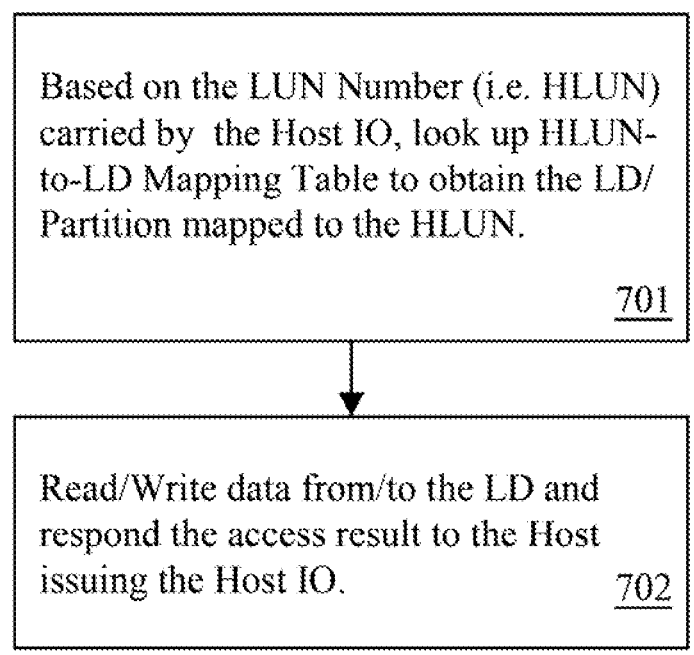
FIG. 10 depicts a flow chart showing an embodiment of the present invention regarding processing an IO request issued by a host shown in FIG. 7.

In the aforementioned step 406, please refer to FIG. 10 for the detailed contents regarding the IO request processed by the SVC 21. At first, in step 701, the SVC 21 interprets the IO request so as to obtain the LUN number going to be accessed. In the present invention, the LUN number is HLUN, and the mapping relationship between the HLUN and its mapped LD/partition is of a unique one-to-one type. Therefore, the present invention can know which LD/partition is targeted by the IO request by looking up in the HLUN-to-LD/partition mapping table without identifying the identity of the host. Step 702 is performed to read/write data from/into the LD/partition directly in accordance with the results of the above step, and to reply the access result to the host issuing the IO request.

It is worthy to be noted that, with respect to FIG. 7, the actual sequence and the number of times for the "Report LUNs" (step 401) and the "Inquiry" commands (step 403) issued by the host may be different from the embodiment shown in FIG. 7. In other embodiments, the host may first issue an "Inquiry" command and then issue a "Report LUNs" command. Further, the number of times of the "Report LUNs" and "Inquiry" commands issued by a host is not limited to one time for each. In the present invention, as long as the host issues the "Report LUNs" command (step 401), the SVC 21 will perform step 402 and the corresponding procedure shown in FIG. 8; and similarly, as long as the host issues the "Inquiry" command (step 403), the SVC 21 will perform step 404 and the corresponding procedure shown in FIG. 9, regardless of the sequence and the number of times for the aforementioned procedure.

The present invention gives a unique HLUN number to each LUN-to-LD/Partition mapping relationship by using a newly-defined HLUN, and presents the HLUN externally to the host. Therefore, all of the hosts in the same storage system can recognize different logical units (i.e., HLUN). Hence, when processing an IO request issued from any of the hosts, the SVC 21 can correctly find the corresponding LD/Partition for accessing data without identifying the identity of the host.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A data accessing method for accessing data stored in a storage space, comprising:
   an information-providing step performed by a controller for providing a host with a host-specific information in accordance with an identity (ID) of the host, thereby responding to at least one first command issued from the host;
   a basic-data-providing step performed by the controller for providing the host with basic data regarding a device type and properties of a target LUN, thereby responding to at least one second command issued from the host;
   a receiving step performed by the controller for receiving an Input/Output (IO) request issued from the host;
   an interpretation step performed by the controller for interpreting the IO request so as to obtain a logical unit number (LUN) carried by the IO request;
   a table lookup step performed by the controller for obtaining a logical drive/partition (LD/partition) associated with the LUN number by looking up in a host logical unit to LD/partition (HLUN-to-LD/Partition) mapping table without identifying the identity of the host, wherein in the HLUN-to-LD/Partition mapping table, a HLUN is uniquely corresponding to the accessible LD/partition;
   a data-accessing step performed by the controller for accessing data from the LD/partition; and
   a responding step performed by the controller for responding an execution result of the data-accessing step to the host;
   wherein, in response to the at least one second command, the controller further performs the steps of:
      looking up in a host-ID table so as to obtain a host number corresponding to the identity of the host;
      determining if the host can recognize the target LUN;
      looking up in a LUN cross-reference information, or formula converting instead, and looking up in the HLUN-to-LD/Partition mapping table in accordance with the host number and the target LUN indicated by the second command, thereby obtaining an LD/partition associated with the target LUN; and
      replying basic data and properties of the LD/partition to the host.

2. The data accessing method of claim 1, wherein the information-providing step comprises:
   providing the host with the host-specific information in accordance with the identity (ID) of the host, thereby responding to a "Report LUNs" command under a Small Computer System Interface (SCSI) standard.

3. The data accessing method of claim 1, wherein, in response to the at least one first command, the controller further performs the steps of:
   looking up in the host-ID table so as to obtain the host number corresponding to the identity of the host;
   looking up in the LUN cross-reference information, or formula converting instead, and looking up in the HLUN-to-LD/Partition mapping table in accordance with the host number so as to obtain the host-specific information, such that the host can use the host-specific information to determine how to access the LD/partition; and
   replying the host-specific information to the host.

4. The data accessing method of claim 1, wherein the host-specific information is generated by using the steps of:
   finding a set of related data associated with the host number obtained from the LUN cross-reference information, or obtained by formula converting instead;
   obtaining a first host LUN (HLUN) from the set of related data and assigning the first HLUN to a selected HLUN;
   looking up in the HLUN-to-LD/Partition mapping table to determine if the selected HLUN has a mapping relationship with the LD/partition; and
   adding the selected HLUN to the host-specific information when the selected HLUN has the mapping relationship with the LD/partition, and omitting the selected HLUN when the selected HLUN does not have the mapping relationship with the LD/partition.

5. The data accessing method of claim 1, wherein the host-specific information is generated by using the steps of:
- finding a set of related data associated with the host number obtained from the LUN cross-reference information, or obtained by formula converting instead;
- looking up a mapping type of a first internal LUN (ILUN) associated with a first HLUN in the set of related data;
- obtaining a selected HLUN, wherein, when the mapping type of the ILUN is a host-specific mapping, the selected HLUN is the first HLUN; when the mapping type of the ILUN is a global mapping, the selected HLUN is a representative HLUN representing the first ILUN;
- looking up in the HLUN-to-LD/Partition mapping table so as to determine if the selected HLUN has a mapping relationship with the LD/partition; and
- adding the selected HLUN to the host-specific information when the selected HLUN has the mapping relationship with the LD/partition, and omitting the selected HLUN when the selected HLUN does not have the mapping relationship with the LD/partition.

6. The data accessing method of claim 1, wherein the host-specific information is generated by using the steps of:
- finding a set of related data associated with the host number obtained from the LUN cross-reference information, or obtained by formula converting instead;
- looking up a mapping type of a first ILUN associated with a first HLUN in the set of related data;
- obtaining a selected HLUN, wherein, when the mapping type of the ILUN is a global mapping, the selected HLUN is a representative HLUN representing the first ILUN;
- looking up in the HLUN-to-LD/Partition mapping table so as to determine if the selected HLUN has a mapping relationship with the LD/partition; and
- adding the selected HLUN to the host-specific information when the selected HLUN has the mapping relationship with the LD/partition, and omitting the selected HLUN when the selected HLUN does not have the mapping relationship with the LD/partition.

7. A data accessing method for accessing data stored in a storage space, comprising:
- an information-providing step performed by a controller for providing a host with a host-specific information in accordance with an identity (ID) of the host, thereby responding to at least one first command issued from the host;
- a basic-data-providing step performed by the controller for providing the host with basic data regarding a device type and properties of a target LUN, thereby responding to at least one second command issued from the host;
- a receiving step performed by the controller for receiving an Input/Output (IO) request issued from the host;
- an interpretation step performed by the controller for interpreting the IO request so as to obtain a logical unit number (LUN) carried by the IO request;
- a table lookup step performed by the controller for obtaining a logical drive/partition (LD/partition) associated with the LUN number by looking up in a host logical unit to LD/partition (HLUN-to-LD/Partition) mapping table without identifying the identity of the host, wherein in the HLUN-to-LD/Partition mapping table, a HLUN is uniquely corresponding to the accessible LD/partition;
- a data-accessing step performed by the controller for accessing data from the LD/partition; and
- a responding step performed by the controller for responding an execution result of the data-accessing step to the host;

wherein, in response to the at least one second command, the controller further performs the steps of:
- looking up in a host-ID table to obtain a host number corresponding to the identity of the host;
- determining if the host can recognize the target LUN; and
- replying to the host that the target LUN is unknown or no device type.

8. The data accessing method of claim 7, wherein the at least one second command is an "Inquiry" command under a SCSI standard.

9. The data accessing method of claim 7, wherein the information-providing step comprises:
- providing the host with the host-specific information in accordance with the identity (ID) of the host, thereby responding to a "Report LUNs" command under a Small Computer System Interface (SCSI) standard.

10. The data accessing method of claim 7, wherein, in response to the at least one first command, the controller further performs the steps of:
- looking up in the host-ID table so as to obtain the host number corresponding to the identity of the host;
- looking up in a LUN cross-reference information, or formula converting instead, and looking up in the HLUN-to-LD/Partition mapping table in accordance with the host number so as to obtain the host-specific information, such that the host can use the host-specific information to determine how to access the LD/partition; and
- replying the host-specific information to the host.

11. The data accessing method of claim 7, wherein the step of determining if the host can recognize the target LUN is performed by comparing the target LUN with the host-specific information to determine if the target LUN is contained in the host-specific information.

12. The data accessing method of claim 11, wherein the host-specific information is generated by using the steps of:
- finding a set of related data associated with the host number obtained from a LUN cross-reference information, or obtained by formula converting instead;
- obtaining a first HLUN from the set of related data and assigning the first HLUN to a selected HLUN;
- looking up in the HLUN-to-LD/Partition mapping table to determine if the selected HLUN has a mapping relationship with the LD/partition; and
- adding the selected HLUN to the host-specific information when the selected HLUN has the mapping relationship with the LD/partition, and omitting the selected HLUN when the selected HLUN does not have the mapping relationship with the LD/partition.

13. The data accessing method of claim 11, wherein the host-specific information is generated by using the steps of:
- finding a set of related data associated with the host number obtained from a LUN cross-reference information, or obtained by formula converting instead;
- looking up a mapping type of a first internal LUN (ILUN) associated with a first HLUN in the set of related data;
- obtaining a selected HLUN, wherein, when the mapping type of the ILUN is a host-specific mapping, the selected HLUN is the first HLUN; when the mapping type of the ILUN is a global mapping, the selected HLUN is a representative HLUN representing the first ILUN;
- looking up in the HLUN-to-LD/Partition mapping table so as to determine if the selected HLUN has a mapping relationship with the LD/partition; and
- adding the selected HLUN to the host-specific information when the selected HLUN has the mapping relationship with the LD/partition, and omitting the selected HLUN when the selected HLUN does not have the mapping relationship with the LD/partition.

14. The data accessing method of claim 11, wherein the host-specific information is generated by using the steps of:
   finding a set of related data associated with the host number obtained from a LUN cross-reference information, or obtained by formula converting instead;
   looking up a mapping type of a first ILUN associated with a first HLUN in the set of related data;
   obtaining a selected HLUN, wherein, when the mapping type of the ILUN is a global mapping, the selected HLUN is a representative HLUN representing the first ILUN;
   looking up in the HLUN-to-LD/Partition mapping table so as to determine if the selected HLUN has a mapping relationship with the LD/partition; and
   adding the selected HLUN to the host-specific information when the selected HLUN has the mapping relationship with the LD/partition, and omitting the selected HLUN when the selected HLUN does not have the mapping relationship with the LD/partition.

15. The data accessing method of claim 7, wherein the table lookup step is performed under a host-specific mapping.

16. A data accessing method for accessing data stored in a storage space, the method comprising the steps of:
   a basic-data-providing step performed by a controller for providing a host with basic data regarding a device type and properties of a target LUN, thereby responding to at least one second command issued from the host;
   a receiving step performed by the controller for receiving an Input/Output (IO) request issued from the host;
   an interpretation step performed by the controller for interpreting the IO request so as to obtain an LUN number carried by the IO request;
   a table lookup step performed by the controller for obtaining at least one LD/partition corresponding to the LUN number by looking up in a host logical unit to LD/partition (HLUN-to-LD/Partition) mapping table without identifying an identity (ID) of the host, wherein in the HLUN-to-LD/Partition mapping table, a HLUN is uniquely corresponding to the accessible LD/partition;
   a data-accessing step performed by the controller for accessing data from the at least one LD/partition; and
   a responding step performed by the controller for responding an execution result of the data-accessing step to the host;
   wherein the LUN number is corresponding to the HLUN shown in the HLUN-to-LD/Partition mapping table, and the HLUN is an exclusive number used for representing a mapping relationship associated with a LD/partition; and
   wherein, in response to the at least one second command, the controller further performs the steps of:
      looking up in a host-ID table so as to obtain a host number corresponding to the identity of the host;
      determining if the host can recognize the target LUN;
      looking up in a LUN cross-reference information, or formula converting instead, and looking up in the HLUN-to-LD/Partition mapping table in accordance with the host number and the target LUN indicated by the second command, thereby obtaining an LD/partition associated with the target LUN; and
      replying basic data and properties of the LD/partition to the host.

17. The data accessing method of claim 16, further comprising the steps of:
   an information-providing step performed by the controller for providing a host with a host-specific information in accordance with the identity of the host, thereby responding to at least one first command issued from the host.

18. The data accessing method of claim 17, wherein the information-providing step comprises the step of:
   providing the host with the host-specific information in accordance with the identity of the host, thereby responding to a "Report LUNs" command under a Small Computer System Interface (SCSI) standard.

19. The data accessing method of claim 17, wherein, in response to the at least one first command, the controller further performs the steps of:
   looking up in the host-ID table so as to obtain the host number corresponding to the identity of the host;
   looking up in the LUN cross-reference information, or formula converting instead, and looking up in the HLUN-to-LD/Partition mapping table in accordance with the host number so as to obtain the host-specific information, such that the host can use the host-specific information to determine how to access a logical unit; and
   replying the host-specific information to the host.

20. The data accessing method of claim 17, wherein the host-specific information is generated by using the steps of:
   finding a set of related data associated with the host number obtained from the LUN cross-reference information, or obtained by formula converting instead;
   obtaining a first HLUN from the set of related data and assigning the first HLUN to a selected HLUN;
   looking up in the HLUN-to-LD/Partition mapping table to determine if the selected HLUN has a mapping relationship with the LD/partition; and
   adding the selected HLUN to the host-specific information when the selected HLUN has the mapping relationship with the LD/partition, and omitting the selected HLUN when the selected HLUN does not have the mapping relationship with the LD/partition.

21. The data accessing method of claim 17, wherein the host-specific information is generated by using the steps of:
   finding a set of related data associated with the host number obtained from the LUN cross-reference information, or obtained by formula converting instead;
   looking up a mapping type of a first internal LUN (ILUN) associated with a first HLUN in the set of related data;
   obtaining a selected HLUN, wherein, when the mapping type of the ILUN is a host-specific mapping, the selected HLUN is the first HLUN; when the mapping type of the ILUN is a global mapping, the selected HLUN is a representative HLUN representing the first ILUN;
   looking up in the HLUN-to-LD/Partition mapping table so as to determine if the selected HLUN has a mapping relationship with the LD/partition; and
   adding the selected HLUN to the host-specific information when the selected HLUN has the mapping relationship with the LD/partition, and omitting the selected HLUN when the selected HLUN does not have the mapping relationship with the LD/partition.

22. The data accessing method of claim 17, wherein the host-specific information is generated by using the steps of:
   finding a set of related data associated with the host number obtained from the LUN cross-reference information, or obtained by formula converting instead;
   looking up a mapping type of a first ILUN associated with a first HLUN in the set of related data;

obtaining a selected HLUN, wherein, when the mapping type of the ILUN is a global mapping, the selected HLUN is a representative HLUN representing the first ILUN;

looking up in the HLUN-to-LD/Partition mapping table so as to determine if the selected HLUN has a mapping relationship with the LD/partition; and adding the selected HLUN to the host-specific information when the selected HLUN has the mapping relationship with the LD/partition, and omitting the selected HLUN when the selected HLUN does not have the mapping relationship with the LD/partition.

23. A data accessing method for accessing data stored in a storage space, the method comprising the steps of:

a basic-data-providing step performed by a controller for providing a host with basic data regarding a device type and properties of a target LUN, thereby responding to at least one second command issued from the host;

a receiving step performed by the controller for receiving an Input/Output (IO) request issued from the host;

an interpretation step performed by the controller for interpreting the IO request so as to obtain an LUN number carried by the IO request;

a table lookup step performed by the controller for obtaining at least one LD/partition corresponding to the LUN number by looking up in a host logical unit to LD/partition (HLUN-to-LD/Partition) mapping table without identifying an identity (ID) of the host, wherein in the HLUN-to-LD/Partition mapping table, a HLUN is uniquely corresponding to the accessible LD/partition;

a data-accessing step performed by the controller for accessing data from the at least one LD/partition; and a responding step performed by the controller for responding an execution result of the data-accessing step to the host;

wherein the LUN number is corresponding to the HLUN shown in the HLUN-to-LD/Partition mapping table, and the HLUN is an exclusive number used for representing a mapping relationship associated with a LD/partition; and wherein, in response to the at least one second command, the controller further performs the steps of:

looking up in a host-ID table to obtain a host number corresponding to the identity of the host;

determining if the host can recognize the target LUN; and replying to the host that the target LUN is unknown or no device type.

24. The data accessing method of claim 23, wherein the at least one second command is an "Inquiry" command under a SCSI standard.

25. The data accessing method of claim 23, wherein the information-providing step comprises the step of:

providing the host with a host-specific information in accordance with the identity of the host, thereby responding to a "Report LUNs" command under a Small Computer System Interface (SCSI) standard.

26. The data accessing method of claim 23, wherein, in response to the at least one first command, the controller further performs the steps of:

looking up in the host-ID table so as to obtain the host number corresponding to the identity of the host;

looking up in a LUN cross-reference information, or formula converting instead, and looking up in the HLUN-to-LD/Partition mapping table in accordance with the host number so as to obtain a host-specific information, such that the host can use the host-specific information to determine how to access a logical unit; and replying the host-specific information to the host.

27. The data accessing method of claim 23, wherein the step of determining if the host can recognize the target LUN is performed by comparing the target LUN with a host-specific information to determine if the target LUN is contained in the host-specific information.

28. The data accessing method of claim 27, wherein the host-specific information is generated by using the steps of:

finding a set of related data associated with the host number obtained from a LUN cross-reference information, or obtained by formula converting instead;

obtaining a first HLUN from the set of related data and assigning the first HLUN to a selected HLUN;

looking up in the HLUN-to-LD/Partition mapping table to determine if the selected HLUN has a mapping relationship with the LD/partition; and adding the selected HLUN to the host-specific information when the selected HLUN has the mapping relationship with the LD/partition, and omitting the selected HLUN when the selected HLUN does not have the mapping relationship with the LD/partition.

29. The data accessing method of claim 27, wherein the host-specific information is generated by using the steps of:

finding a set of related data associated with the host number obtained from a LUN cross-reference information, or obtained by formula converting instead;

looking up a mapping type of a first ILUN associated with a first HLUN in the set of related data;

obtaining a selected HLUN, wherein, when the mapping type of the ILUN is a host-specific mapping, the selected HLUN is the first HLUN; when the mapping type of the ILUN is a global mapping, the selected HLUN is a representative HLUN representing the first ILUN;

looking up in the HLUN-to-LD/Partition mapping table so as to determine if the selected HLUN has a mapping relationship with the LD/partition; and adding the selected HLUN to the host-specific information when the selected HLUN has the mapping relationship with the LD/partition, and omitting the selected HLUN when the selected HLUN does not have the mapping relationship with the LD/partition.

30. The data accessing method of claim 27, wherein the host-specific information is generated by using the steps of:

finding a set of related data associated with the host number obtained from a LUN cross-reference information, or obtained by formula converting instead;

looking up a mapping type of a first ILUN associated with a first HLUN in the set of related data;

obtaining a selected HLUN, wherein, when the mapping type of the ILUN is a global mapping, the selected HLUN is a representative HLUN representing the first ILUN;

looking up in the HLUN-to-LD/Partition mapping table so as to determine if the selected HLUN has a mapping relationship with the LD/partition; and adding the selected HLUN to the host-specific information when the selected HLUN has the mapping relationship with the LD/partition, and omitting the selected HLUN when the selected HLUN does not have the mapping relationship with the LD/partition.

31. The data accessing method of claim 23, wherein the table lookup step is performed under a host-specific mapping.

32. A data accessing method for accessing data stored in a storage space, the method comprising the steps of:

an information-providing step performed by a controller for providing a host with a host-specific information in accordance with an identity (ID) of the host, thereby responding to at least one first command issued from the host; wherein, in response to the at least one first command, the controller further performs the steps of:
  looking up in a host-ID table so as to obtain a host number corresponding to the identity of the host;
  looking up in a LUN cross-reference information, or formula converting instead, so as to obtain at least one HLUN assigned to the host number;
  looking up in a host logical unit to LD/partition (HLUN-to-LD/Partition) mapping table with respect to the at least one HLUN without identifying the identity of the host to determine if the at least one HLUN has a mapping relationship with at least one LD/partition, wherein in the HLUN-to-LD/Partition mapping table, the HLUN is uniquely corresponding to the accessible LD/partition; and
  responding to the host one or more of the at least one HLUN that have the mapping relationship with the at least one LD/partition;
a basic-data-providing step performed by the controller for providing the host with basic data regarding a device type and properties of a target LUN, thereby responding to at least one second command issued from the host; wherein, in response to the at least one second command, the controller further performs the steps of:
  looking up in the host-ID table so as to obtain the host number corresponding to the identity of the host;
  determining if the host can recognize the target LUN;
  looking up in the LUN cross-reference information, or formula converting instead, and looking up in the HLUN-to-LD/Partition mapping table in accordance with the host number and the target LUN indicated by the second command, thereby obtaining an LD/partition associated with the target LUN; and
  replying basic data and properties of the LD/partition to the host;
a receiving step performed by the controller for receiving an Input/Output (IO) request issued from the host; and
a data-accessing step performed by the controller for accessing data from the LD/partition having the mapping relationship with the target HLUN, thereby responding to the IO request.

33. The data accessing method of claim 1, wherein the at least one second command is an "Inquiry" command under a SCSI standard.

34. The data accessing method of claim 1, wherein the step of determining if the host can recognize the target LUN is performed by comparing the target LUN with the host-specific information to determine if the target LUN is contained in the host-specific information.

35. The data accessing method of claim 1, wherein the table lookup step is performed under a host-specific mapping.

36. The data accessing method of claim 16, wherein the step of determining if the host can recognize the target LUN is performed by comparing the target LUN with a host-specific information to determine if the target LUN is contained in the host-specific information.

37. The data accessing method of claim 16, wherein the table lookup step is performed under a host-specific mapping.

38. The data accessing method of claim 16, wherein the at least one second command is an "Inquiry" command under a SCSI standard.

39. The data accessing method of claim 34, wherein the host-specific information is generated by using the steps of:
  finding a set of related data associated with the host number obtained from the LUN cross-reference information, or obtained by formula converting instead;
  obtaining a first HLUN from the set of related data and assigning the first HLUN to a selected HLUN;
  looking up in the HLUN-to-LD/Partition mapping table to determine if the selected HLUN has a mapping relationship with the LD/partition; and
  adding the selected HLUN to the host-specific information when the selected HLUN has the mapping relationship with the LD/partition, and omitting the selected HLUN when the selected HLUN does not have the mapping relationship with the LD/partition.

40. The data accessing method of claim 34, wherein the host-specific information is generated by using the steps of:
  finding a set of related data associated with the host number obtained from the LUN cross-reference information, or obtained by formula converting instead;
  looking up a mapping type of a first internal LUN (ILUN) associated with a first HLUN in the set of related data;
  obtaining a selected HLUN, wherein, when the mapping type of the ILUN is a host-specific mapping, the selected HLUN is the first HLUN; when the mapping type of the ILUN is a global mapping, the selected HLUN is a representative HLUN representing the first ILUN;
  looking up in the HLUN-to-LD/Partition mapping table so as to determine if the selected HLUN has a mapping relationship with the LD/partition; and
  adding the selected HLUN to the host-specific information when the selected HLUN has the mapping relationship with the LD/partition, and omitting the selected HLUN when the selected HLUN does not have the mapping relationship with the LD/partition.

41. The data accessing method of claim 34, wherein the host-specific information is generated by using the steps of:
  finding a set of related data associated with the host number obtained from the LUN cross-reference information, or obtained by formula converting instead;
  looking up a mapping type of a first ILUN associated with a first HLUN in the set of related data;
  obtaining a selected HLUN, wherein, when the mapping type of the ILUN is a global mapping, the selected HLUN is a representative HLUN representing the first ILUN;
  looking up in the HLUN-to-LD/Partition mapping table so as to determine if the selected HLUN has a mapping relationship with the LD/partition; and
  adding the selected HLUN to the host-specific information when the selected HLUN has the mapping relationship with the LD/partition, and omitting the selected HLUN when the selected HLUN does not have the mapping relationship with the LD/partition.

42. The data accessing method of claim 36, wherein the host-specific information is generated by using the steps of:
  finding a set of related data associated with the host number obtained from the LUN cross-reference information, or obtained by formula converting instead;
  obtaining a first HLUN from the set of related data and assigning the first HLUN to a selected HLUN;
  looking up in the HLUN-to-LD/Partition mapping table to determine if the selected HLUN has a mapping relationship with the LD/partition; and
  adding the selected HLUN to the host-specific information when the selected HLUN has the mapping relationship with the LD/partition, and omitting the selected HLUN when the selected HLUN does not have the mapping relationship with the LD/partition.

43. The data accessing method of claim 36, wherein the host-specific information is generated by using the steps of:
- finding a set of related data associated with the host number obtained from the LUN cross-reference information, or obtained by formula converting instead;
- looking up a mapping type of a first ILUN associated with a first HLUN in the set of related data;
- obtaining a selected HLUN, wherein, when the mapping type of the ILUN is a host-specific mapping, the selected HLUN is the first HLUN; when the mapping type of the ILUN is a global mapping, the selected HLUN is a representative HLUN representing the first ILUN;
- looking up in the HLUN-to-LD/Partition mapping table so as to determine if the selected HLUN has a mapping relationship with the LD/partition; and
- adding the selected HLUN to the host-specific information when the selected HLUN has the mapping relationship with the LD/partition, and omitting the selected HLUN when the selected HLUN does not have the mapping relationship with the LD/partition.

44. The data accessing method of claim 36, wherein the host-specific information is generated by using the steps of:
- finding a set of related data associated with the host number obtained from the LUN cross-reference information, or obtained by formula converting instead;
- looking up a mapping type of a first ILUN associated with a first HLUN in the set of related data;
- obtaining a selected HLUN, wherein, when the mapping type of the ILUN is a global mapping, the selected HLUN is a representative HLUN representing the first ILUN;
- looking up in the HLUN-to-LD/Partition mapping table so as to determine if the selected HLUN has a mapping relationship with the LD/partition; and
- adding the selected HLUN to the host-specific information when the selected HLUN has the mapping relationship with the LD/partition, and omitting the selected HLUN when the selected HLUN does not have the mapping relationship with the LD/partition.

* * * * *